US011620416B2

(12) United States Patent
Lemieux et al.

(10) Patent No.: US 11,620,416 B2
(45) Date of Patent: Apr. 4, 2023

(54) SYSTEMS AND METHODS FOR DETERMINING DIGITAL MODEL POSITIONING FOR GRASPING

(71) Applicant: Dassault Systemes Americas Corp., Waltham, MA (US)

(72) Inventors: Pierre-Olivier Lemieux, Montreal (CA); Quentin Bourret, Montreal (CA); Rachid Aissaoui, Montreal (CA); Nicola Hagemeister, Montreal (CA)

(73) Assignee: DASSAULT SYSTEMES AMERICAS CORP., Waltham, MA (US)

( * ) Notice: Subject to any disclaimer, the term of this patent is extended or adjusted under 35 U.S.C. 154(b) by 300 days.

(21) Appl. No.: 16/864,590

(22) Filed: May 1, 2020

(65) Prior Publication Data

US 2020/0349300 A1    Nov. 5, 2020

Related U.S. Application Data

(60) Provisional application No. 62/842,337, filed on May 2, 2019, provisional application No. 62/842,371, filed (Continued)

(51) Int. Cl.
*G06F 30/12* (2020.01)
*G06F 30/10* (2020.01)
(Continued)

(52) U.S. Cl.
CPC .............. *G06F 30/12* (2020.01); *G06F 30/10* (2020.01); *G06V 10/22* (2022.01); *G06V 10/44* (2022.01);
(Continued)

(58) Field of Classification Search
CPC ...... G06F 30/10; G06F 2111/04; G06F 30/12; G06F 30/00; G06F 30/17; G06F 30/18;
(Continued)

(56) References Cited

U.S. PATENT DOCUMENTS 10,576,625 B1    3/2020 Stubbs et al.
2009/0173560 A1    7/2009 Nakamoto et al.
(Continued)

OTHER PUBLICATIONS

Goussous et al. "A New Methodology for Human Grasp Predication" IEEE Transactions on Systems, Man, and Cybernetics—Part A: Systems and Humans, vol. 39, No. 2, Mar. 2009 (Year: 2009).*
(Continued)

*Primary Examiner* — Rehana Perveen
*Assistant Examiner* — Troy A Maust
(74) *Attorney, Agent, or Firm* — Hamilton, Brook, Smith & Reynolds, P.C.

(57) ABSTRACT

Embodiments determine positioning of a mannequin. One such embodiment begins by determining a frame of a grasping element of a mannequin represented by a computer-aided design (CAD) model and determining a frame of an object to be grasped, where is object is also represented by a CAD model. To continue, degrees of freedom of the mannequin are specified and limits on the specified degrees of freedom are set. In turn, using an inverse kinematic solver, positioning of the mannequin grasping the object is determined based upon: (i) the determined frame of the grasping element, (ii) the determined frame of the object, (iii) the specified degrees of freedom, and (iv) the set limits on the specified degrees of freedom.

20 Claims, 28 Drawing Sheets

Related U.S. Application Data on May 2, 2019, provisional application No. 62/842,350, filed on May 2, 2019.

(51) Int. Cl.
| | |
|---|---|
| *G06V 10/22* | (2022.01) |
| *G06V 10/44* | (2022.01) |
| *G06V 20/64* | (2022.01) |
| *G06F 111/04* | (2020.01) |

(52) U.S. Cl.
CPC ........ *G06V 20/653* (2022.01); *G06F 2111/04* (2020.01); *G06V 2201/06* (2022.01)

(58) Field of Classification Search
CPC ...... G06V 10/22; G06V 10/44; G06V 20/653; G06V 2201/06; G06V 30/1444; G06V 30/1801; G06V 30/182; G06V 30/1823; G06V 30/1826; G06V 30/1829; G06V 30/1831; G06V 30/1834; G06V 30/1837; G06K 9/00

See application file for complete search history.

(56) References Cited

U.S. PATENT DOCUMENTS

| | | | |
|---|---|---|---|
| 2010/0256790 | A1 | 10/2010 | Teran-Matus et al. |
| 2014/0163731 | A1 | 6/2014 | Shi et al. |
| 2014/0371871 | A1 | 12/2014 | Farina et al. |
| 2019/0248003 | A1 | 8/2019 | Nagarajan et al. |
| 2019/0366539 | A1 | 12/2019 | Arisoy et al. |
| 2020/0349299 | A1 | 11/2020 | Macloud et al. |
| 2021/0031375 | A1 | 2/2021 | Drumwright et al. |
| 2023/0021942 | A1 | 1/2023 | Zeighami et al. |

OTHER PUBLICATIONS

Al-Masri et al. "Human-Like Motion Based On a Geometrical Inverse Kiematics and Energetic Optimization" 2008 IEEE/RSJ International Conference on Intelligent Robots and Systems (Year: 2008).*
León et al. "From Robot to Human Grasping Simulation" 2014, Springer, Cognitive Systems Monographs vol. 19 (Year: 2014).*
Johns et al. "Deep Learning a Grasp Function for Grasping under Gripper Pose Uncertainty" 2016 IEEE/RSJ International Conference on Intelligent Robots and Systems (IROS) (Year: 2016).*
Bourret, Q., et al., "Ergo4All: An Ergonomic Guidance Tool for Non-ergonomist", In: Black N.L., Neumann W.P., Noy I. (eds) Proceedings of the 21st Congress of the International Ergonomics Association (IEA 2021). IEA 2021.
Cort, J.A. and Devries, D., "Accuracy of Postures Predicted Using a Digital Human Model During Four Manual Exertion Tasks, and Implications for Ergonomic Assessments", IISE Transactions on Occupational Ergonomics and Human Factors, 7:43-58 (2019).
Hogberg, D., et al., "IMMA—Intelligently Moving Manikins in Automotive Applications", Third International Summit on Human Simulation (ISHS2014) 2014.
Lemieux, Pierre-Olivier, et al., "A visual acuity constraint for digital human modeling", Conference proceedings 4th. 2016.
Perez, J., et al., "Ergonomists' and Engineers' Views on the Utility of Virtual Human Factors Tools", Human Factors and Ergonomics in Manufacturing & Services Industries, 25 (3) 279-293 (2015).
Zeighami, A., et al., "Stepping behavior for stability control of a digital human model", AISB/ASB 2019.
Abdel-Malek, K., et al., "Santos: An integrated human modeling and simulation platform, in DHM and Posturography". 2019, Elsevier. p. 63-77.
Abdel-Malek, K., et al., "Towards a new generation of virtual humans. International Journal of Human Factors Modelling and Simulation", 2006. 1(1): p. 2-39.
Afyouni, I, et al. "Spatial models for context-aware indoor navigation systems: A survey", Journal of Spatial Information Science, 2012, 1 (4), pp. 85-123.
Baerlocher, P. and R. Boulic, An inverse kinematic architecture enforcing an arbitrary number of strict priority levels. The visual computer, 2004. 20(6): p. 402-417.
Bataineh, M., et al. "Neural network for dynamic human motion prediction", Science Direct, Expert Systems with Applications, 48 (2015) 26-34.
Bhatia, N., et al., "Modeling visually guided hand reach for Digital Human Models", Science Direct, 6th Internatioanl Conference on Applied Human Factors and Ergonomics (WHFE 2015) and the Affiliated Conferences, AHFE 2015, Procedia Manufacturing 3 (2015) 3820-3827.
Björkenstam, S., et al., "Enhancing digital human motion planning of assembly tasks through dynamics and optimal control", Science Direct, Procedia CIRP, 2016. 44: p. 20-25.
Burns, E., et al., "The hand is more easily fooled than the eye: Users are more sensitive to visual interpenetration than to visual-proprioceptive discrepancy". Presence: teleoperators & virtual environments, 2006. 15(1): p. 1-15.
Chaffin, D.B., "Digital Human Modeling for Workspace Design", Reviews of Human Factors and Ergonomics, Dec. 2008.
Chaffin, D.B., "Human motion simulation for vehicle and workplace design", Human Factors and Ergonomics in Manufacturing & Service Industries, 2007. 17(5): p. 475-484.
Chaffin et al., "Simulating Reach Motions", Society of Automotive Engineers, Inc. 1999.
Diffrient et al., "Humanscale 7/8/9," 1982, The MIT Press.
Faraway, J.J., "Regression analysis for a functional response. Technometrics," 1997. 39(3): p. 254-261.
Feyen, R., et al., "Computer-aided ergonomics: a case study of incorporating ergonomics analyses into workplace design". Applied ergonomics, 2000. 31(3): p. 291-300.
Frazzoli, E., et al. "Algorithmic Foundations for Robotics X", Proceedings of the Tenth Workshop on the Algorithmic Foundations of Robotics, 2013.
Jung, E.S. and J. Choe, "Human reach posture prediction based on psychophysical discomfort," International Journal of Industrial Ergonomics, 1996. 18(2-3): p. 173-179.
Jung, E.S., et al., "Upper body reach posture prediction for ergonomic evaluation models". International Journal of Industrial Ergonomics, 1995. 16(2): p. 95-107. (Science Direct).
LaValle, S.M., et al. "Randomized Kinodynamic Planning", The International Journal of Robotics Research, vol. 20, No. 5, May 5, 2001, pp. 378-400.
Lehericey, F., "Iterative and Predictive Ray-Traced Collision Detection for Multi-GPU Architectures," Graphics [cs.GR]. 2013.
Li, Y., et al. "On motion planning for narrow-clearance assemblies using virtual manikins" Science Direct, 51st CIRP Conference on Manufacturing Systems, Procedia CIRP 72 (2018) 790-795.
Liu, Y. and N.I. Badler, "Real-time reach planning for animated characters using hardware acceleration.", in Proceedings 11th IEEE international workshop on program comprehension. 2003. IEEE.
Macloud, A., et al., "Extracting Grasping Cues From One-Handed Tools Geometry For Digital Human Models," (2019).
Namgung, I., "Path space approach for planning 2d shortest path based on elliptic workspace geometry mapping", KSME international Journal, 2004. 18(1): p. 92-105.
Park, W., et al., "Toward memory-based human motion simulation: development and validation of a motion modification algorithm", IEEE transactions on systems, man, and cybernetics-Part A: Systems and Humans, 2004. 34 (3): p. 376-386.
Peinado, M., et al., "Full-body avatar control with environment awareness". IEEE Computer Graphics and Applications, 2009. 29(3): p. 62-75.
Perez, M.A., "Prediction of whole-body lifting kinematics using artificial neural networks", 2005, Virginia Tech.
Pettré, J., et al., "Planning human walk in virtual environments", in IEEE/RSJ International Conference on Intelligent Robots and Systems. 2002. IEEE.

(56) References Cited

OTHER PUBLICATIONS

Pettré, J., et al., "A 2-Stages Locomotion Planner for Digital Actors", Eurographics, SIGGRAPH Symposium on Computer Animation (2003).
Reed, M.P, et al., "The HUMOSIM Ergonomics Framework: A New Approach to Digital Human Simulation for Ergonomic Analysis", SAE Technical Papers, Jul. 2006.
Reed, M.P. and D.W. Wagner, "An integrated model of gait and transition stepping for simulation of industrial workcell tasks", SAE Transactions, 2007: p. 2062-2072.
Russell, S., et al., "Artificial Intelligence A Modern Approach" 3rd Edition Pearson Education, Inc. 2010.
Ryan, P.W., Cockpit Geometry Evaluation. vol. V. Validation. 1969, Boeing CO Seattle WA Military Aircraft Systems Div.
Siciliano, B., et al., "Robotics—Modeling, Planning and Control", Advanced Texbooks in Control and Signal Processing (2009).
Wagner, D.W., et al., "Predicting foot positions for manual materials handling tasks", SAE transactions, 2005: p. 2872-2876.
Yang, L., et al. "Survey of Robot 3D Path Planning Algorithms", Journal of Control Science and Engineering, vol. 2016, Sril ID 7426913, 22 pages.
Zhang, X., et al., "Optimization-based differential kinematic modeling exhibits a velocity-control strategy for dynamic posture determination in seated reaching movements", Journal of Biomechanics 31 (1998) 1035-1042.
Zhao, L., et al., "Applying Empirical Data on Upper Torso Movement to Real-time Collision-free Reach Tasks", SAE Technical Papers—Jun. 2005.
Zheng, Y., et al., "Ray-Shooting Algorithims for Robotics", Disney Research Pittsburgh, 2012.
Au, O.K.-C., et al., "Skeleton extraction by mesh contraction," in: ACM transactions on graphics, vol. 27, No. 3, article 44 (2008).
Baerlocher, P., "Inverse kinematics techniques of the interactive posture control of articulated figures," [Ph. D. thesis]. Ecole Polytechnique Federale de Lausanne (EPFL) (2001).
Berscheid, L., et al., "Improving Data Efficiency of Self-supervised Learning for Robotic Grasping," arXiv preprint arXiv: 1903.00228, (2019).
Bohg, J. and D. Kragic, "Learning grasping points with shape context," Robotics and Autonomous Systems, vol. 58, No. 4, pp. 362-377 (2009).
Bohg, J., et al., "Data-driven grasp synthesis—a survey," *IEEE Transactions on Robotics*, 30(2), 289-309 (2014).
Buss, S.R. and Kim, J.-S., "Selectively damped least squares for inverse kinematics," Journal of Graphics tools, 10(3). 37-49 (2004).
Cheze, L., et al., "Determination of the number of degrees of freedom of the trapeziometacarpal joint—an in vitro study," IRBM, 33(4):271-277 (2012).
Cornea, N.D., et al., "Curve-skeleton properties, applications, and algorithms," IEEE Transactions on Visualization & Computer Graphics, 20 pages (2007).
Cutkosky, M.R. and R.D. Howe, "Human Grasp Choice and Robotic Grasp Analysis," In *Dextrous Robot Hands*, Springer-Verlag, pp. 5-31 (1990).
Cutkosky, M.R., "On grasp choice, grasp models, and the design of hands for manufacturing tasks," IEEE Transactions on robotics and automation, 5(3): 269-279 (1989).
Diaz, C., et al., "Grasping points for handle objects in a cooperative disassembly system," IFAC Proceedings vols. 40: 126-131(2007).
Ekvall, S. and Kragic, D., "Interactive grasp learning based on human demonstration," in Robotics and Automation, Proceedings. ICRA'04. 2004 IEEE International Conference on, IEEE, 3519-3524 (2004).
El-Khoury, S. and A. Sahbani, "A new strategy combining empirical and analytical approaches for grasping unknown 3D objects," Robotics and Autonomous Systems, 34 pages (2009).
El-Khoury, S., "Approche Mixte, Analytique et par Apprentissage, pour la Synthèse d'une Prise Naturelle" (Thesis, Pierre et Marie Curie University, Paris, France, 2008).

Endo, Y., et al., "An application of a digital hand to ergonomic assessment of handheld information appliances," SAE Technical Paper (2006).
Endo, Y., et al., "A computer-aided ergonomic assessment and product design system using digital hands," in International Conference on Digital Human Modeling, Springer, 833-842 (2007).
Endo, Y., et al., "Virtual grasping assessment using 3D digital hand model," in Annual Applied Ergonomics Conference: Celebrating the Past-Shaping the Future (2007).
Endo, Y., et al., "Optimization-based grasp posture generation method of digital hand for virtual ergonomics assessment," SAE international journal of passenger cars-electronic and electrical systems, 1 (2008-01-1902). 590-598 (2009).
Feix, T., et al., "The grasp taxonomy of human grasp types," IEEE Transactions on Human-Machine Systems, 46(1): 66-77 (2016).
Fischer, M., et al., "Learning techniques in a dataglove based telemanipulation system for the DLR hand," in Robotics and Automation, Proceedings. 1998 IEEE International Conference on, (1998), IEEE, 1603-1608 (1998).
Goussous, F. A., "Grasp Planning for digital humans," Thesis, University of Iowa, 87 pages (2007).
Holleman, C. and L.E. Kavraki, "A framework for using the workspace medial axis in PRM planners," in: Proceedings 2000 ICRA. Millennium Conference. IEEE International Conference on Robotics and Automation. Symposia Proceedings (Cat. No. 00CH37065), IEEE, pp. 1408-1413 (2000).
Huang, J. and C.-H. Menq, "Automatic data segmentation for geometric feature extraction from unorganized 3-D coordinate points," IEEE Transactions on Robotics and Automation, vol. 17, No. 3, pp. 268-279 (2001).
Hueser, M., et al., "Learning of demonstrated grasping skills by stereoscopic tracking of human head configuration," in Robotics and Automation, ICRA 2006. Proceedings 2006 IEEE International Conference on, IEEE, 2795-2800 (2006).
Kyota, F., et al., "Detection and evaluation of grasping positions for autonomous agents," In International Conference on Cyberworlds, 9 pages (2005).
Lemieux, P.-O., et al., "Degrees of freedom coupling adapted to the upper limb of a digital human model," International Journal of Human Factors Modelling and Simulation, 5(4): 314-337 (2017).
Li, X., et al., "Point cloud surface segmentation based on volumetric eigenfunctions of the Laplace-Beltrami operator," Computer Aided Geometric Design, 71: 157-175 (2019).
Li, Y. and N. Pollard, "A Shape Matching Algorithm for Synthesizing Humanlike Enveloping Grasps," in IEEE/RAS Int. Conf. on Humanoid Robots (Humanoids), pp. 442-449 (2005).
Ma, C.-M., et al., "Three-dimensional topology preserving reduction on the 4-subfields," IEEE Transactions on Pattern Analysis and Machine Intelligence, 24: 1594-1605 (2002).
Miller, A.T., et al., "Automatic grasp planning using shape primitives," in Robotics and Automation, Proceedings. ICRA'03. IEEE International Conference on, IEEE, 1824-1829 (2003).
Minetto, R., et al., "An optimal algorithm for 3D triangle mesh slicing," Computer-Aided Design, 92: 1-10 (2017).
Myers, A., et al., "Affordance Detection of Tool Parts from Geometric Features," In International Conference on Robotics and Automation, pp. 1374-1381 (2015).
Nguyen, V.-D., "Constructing force-closure grasps," Int. Jour. Robotic Res, 7(3): 3-16 (1988).
Nguyen, V.-D., "Constructing stable grasps in 3D," in Robotics and Automation Proceedings. 1987 IEEE International Conference on, IEEE, 234-239 (1987).
Parkinson, M.B. and Reed, M.P., "Creating virtual user populations by analysis of anthropometric data," International Journal of Industrial Ergonomics, 40(1): 106-111 (2010).
Pitarch, E.P., et al., "SANTOS™ hand: a 25 degree-of-freedom model," SAE Technical Paper (2005).
Prabhakar, S. and M.R. Henderson, "Automatic form-feature recognition using neural-network-based techniques on boundary representations of solid models," Computer-Aided Design, 24: 381-393 (1992).
Reed, M.P., et al., "Methods for measuring and representing automobile occupant posture," SAE Technical Paper (1999).

(56) References Cited

OTHER PUBLICATIONS

Reed, M.P., et al., "Developing and implementing parametric human body shape models in ergonomics software," in Proceedings of the 3rd International Digital Human Modeling Conference. Tokyo, Japan (2014).
Roa, et al., "Grasp quality measures: review and performance," Autonomous robots, 38(1): 65-88 (2014).
Rouhi, R., et al., "A review on feature extraction techniques in face recognition," Signal & Image Processing, vol. 3, No. 6, (2012).
Sahbani, A., et al., "An overview of 3D object grasp synthesis algorithms," Robotics and Autonomous Systems, 36 pages (2012).
Schmidt, P., et al., "Grasping of unknown objects using deep convolutional neural networks based on depth images," in: 2018 IEEE International Conference on Robotics and Automation (ICRA), IEEE, pp. 6831-6838 (2018).
Svensson, S., et al., "Curve skeletonization of surface-like objects in 3D images guided by voxel classification," Pattern Recognition Letters, 23: 1419-1426 (2002).
Tay, S.C., et al., "In-vivo kinematic analysis of forearm rotation using helical axis analysis," Clinical Biomechanics, 25(7): 655-659 (2010).
Vahrenkamp, N., et al., "Planning high-quality grasps using mean curvature object skeletons," IEEE Robotics and Automation Letters, 3: 911-918 (2017).
Wu, G., et al., "ISB recommendation on definitions of joint coordinate system of various joints for the reporting of human joint motion—Part I: ankle, hip, and spine," Journal of biomechanics, 35(4): 543-548 (2002).
Wu, G., et al., "ISB recommendation on definitions of joint coordinate systems of various joints for the reporting of human joint motion—Part II: shoulder, elbow, wrist and hand," Journal of biomechanics, 38(5): 981-992 (2005).
Yamane, K., et al., "Synthesizing animations of human manipulation tasks," ACM Transactions on Graphics, 23(3) (2004).
Zhang, Z., et al., "FeatureNet: Machining feature recognition based on 3D Convolution Neural Network," Computer-Aided Design, 101: 12-22 (2018).
Zhou, W. and M.P. Reed, "Validation of the human motion simulation framework: posture prediction for standing object transfer tasks," SAE Technical Paper (2009).
Gibson, James, J., "The Theory of Affordances," *The Ecological Approach to Visual Perception* (1979).
Badler, N. I., et al., "Animation control for real-time virtual humans", Communications of the ACM, vol. 42, No. 8, 1999, pp. 64-73.
Bekey, G. A., "Knowledge-Based Control of Grasping in Robot Hands Using Heuristics from Human Motor Skills", IEEE Transactions on Robotics, vol. 9, No. 6, 1993, pp. 709-722.
Blanchonette, P., "Jack Human Modelling Tool: A Review", Australian Government Deparment of Defense, Defense Science and Technology Organisation Technical Report, DSTO-TR-2364, AR-014-672, Jan. 2010, Victoria, Australia.
Bourret et al., "Flexible hand posture for tools grasping", 7 pages (Nov. 2021).
Bourret, Q., et al., "Grasp Planning Of Unknown Object For Digital Human Model", 13th International Conference on Applied Human Factors and Ergonomics. (2022).
Duffy, V.G., "Handbook of Digital Human Modeling: Research for Applied Ergonomics and Human Factors Engineering (1st ed.)". Chapter 2.4 (2008).
Ergonomics Specialist—Dassault Systèmes, "Human-Centered Prodcut and Workplace Design with Virtual Ergonomics", https://www.3ds.com/products-services/delmia/disciplines/industrial-engineering/tag/88-1007/. Downloaded from Internet Jan. 11, 2023.
European Committee for Standardization, EN 1005-2. Safety of machinery—Human physical performance. Part 2: Manual handling of machinery and component parts of machinery. Brussels, European Committee for Standardization (2003).
European Committee for Standardization, EN 1005-3:2002+ A1:2008, "Safety of machinery—Human physical performance—Part 3: Recommended force limits for machinery operation", Oct. 2008.
European Committee for Standardization, EN 1005-4:2002+ A1:2008, "Safety of machinery—Human physical performance—Part 4: Evaluation of working postures and movements in relation to machinery", Oct. 2008.
Feix, T., et al., "Analysis of Human Grasping Behavior: Object Characteristics and Grasp Type", IEEE Translation on Haptics, vol. 7, No. 3, 2014, pp. 311-322.
Gallagher, S. and M.C. Schall Jr, "Musculoskeletal disorders as a fatigue failure process: evidence, implications and research needs," Ergonomics, 60(2): 255-269 (2016).
Hignett, S., et al. REBA Employee Assessment Worksheet based on Technical note: Rapid Entire Body Assessment (REBA), Applied Ergonomics 31 (2000) 201-205.
Hignett, S., et al., "Rapid entire body assessment (REBA)", Applied Ergonomics, 31(2), 201-205 (2000).
Human Factors Engineering, "The next generation of human modeling and simulation begins when you're ready," Virtual Soldier Research, 8 pages (2004).
International Labour Office in collaboration with the International Ergonomics Association, Ergonomic Checkpoints: Practical and Easy-To-Implement Solutions for Improving Safety, Health, and Working Conditions, Second Edition, 2010, Geneva, Switzerland.
International Organization for Standardization, ISO 11228-3:2007, "Ergonomics—Manual handling—part 3: Handling of low loads at high frequency", 2007, Geneva, Switzerland.
International Organization for Standardization, ISO 14738:2002, "Safety of machinery—Anthropometric requirements for the design of workstations at machinery", p. 12, Sep. 2002, Geneva, Switzeriand.
International Organization for Standardization, ISO 14738:2003, "Safety of machinery—Anthropometric requirements for the design of workstations at machinery" Geneva: International Organization for Standardization (2003).
Macloud, A., et al., "Extracting Grasping Cues from Pistol-Shaped Tools for Digital Human Models", Computer-Aided Design & Applications, vol. 18, No. 6, 2021, pp. 1167-1185.
McAtamney, L., et al., "RULA: a survey method for the investigation of work-related upper limb disorders", Applied Ergonomics, pp. 91-99, vol. 24, No. 2, Apr. 1993.
Myers, A., et al., "Affordance of Object Parts from Geometric Features," In International Conference on Robotics and Automation, pp. 1374-1381 (2015).
Salvendy, G., Handbook of Human Factors and Ergonomics, Fourth Edition, 2012, John Wiley & Sons, Inc., Hoboken, New Jersey.
SantosHuman, Inc., "PredictiveHuman Model", https://www.santoshumaninc.com; (8 pages) downloaded from Internet Jan. 11, 2023.
Waters, Thomas R., et al., "Revised NIOSH equation for the design and evaluation of manual lifting tasks", Ergonomics, pp. 749-776, vol. 26, No. 7, 1993.
Zhou, W., et al., Simulating Complex Automotive Assembly Tasks using the HUMOSIM Framework, SAE International, 2009,10 pages.
International Organization for Standardization, ISO 11226:2000, "Ergonomics—Evaluation of static working postures" Technical Corrigendum 1,2000, Geneva, Switzerland.
Mital, A.: Guide to Manual Materials Handling. CRC Press, Boca Raton (1997).
Stephens, A., and M. L. H. Jones. "Workplace methods and use of digital human models." Handbook of Digital Human Modeling, USA: Taylor and Francis 6 (2009): 1-6.

* cited by examiner

SYSTEMS AND METHODS FOR DETERMINING DIGITAL MODEL POSITIONING FOR GRASPING

RELATED APPLICATIONS

This application claims the benefit of U.S. Provisional Application No. 62/842,337, filed on May 2, 2019, U.S. Provisional Application No. 62/842,371 filed on May 2, 2019, and U.S. Provisional Application No. 62/842,350 filed on May 2, 2019. This application is related to the non-provisional U.S. application Ser. No. 16/864,484 "Extracting Grasping Cues From Tool Geometry For Digital Human Models" by Alexandre Macloud, Louis Rivest, Ali Zeighami, Pierre-Olivier Lemieux, and Rachid Aissaoui.

The entire teachings of the above applications are incorporated herein by reference.

BACKGROUND

A number of existing product and simulation systems are offered on the market for the design and simulation of objects, e.g., humans, parts, and assemblies of parts, amongst other examples. Such systems typically employ computer aided design (CAD) and/or computer aided engineering (CAE) programs. These systems allow a user to construct, manipulate, and simulate complex three-dimensional models of objects or assemblies of objects. These CAD and CAE systems, thus, provide a representation of modeled objects using edges, lines, faces, polygons, or closed volumes. Lines, edges, faces, polygons, and closed volumes may be represented in various manners, e.g., non-uniform rational basis-splines (NURBS).

CAD systems manage parts or assemblies of parts of modeled objects, which are mainly specifications of geometry. In particular, CAD files contain specifications, from which geometry is generated. From geometry, a representation is generated. Specifications, geometries, and representations may be stored in a single CAD file or multiple CAD files. CAD systems include graphic tools for representing the modeled objects to designers; these tools are dedicated to the display of complex objects. For example, an assembly may contain thousands of parts. A CAD system can be used to manage models of objects, which are stored in electronic files.

CAD and CAE systems use of a variety of CAD and CAE models to represent objects. These models may be programmed in such a way that the model has the properties (e.g., physical, material, or other physics based) of the underlying real-world object or objects that the model represents. CAD/CAE models may be used to perform simulations of the real-word object that it represents.

SUMMARY

Simulating a human utilizing a tool is a common simulation task implemented and performed by CAD and CAE systems. Performing these simulations requires setting grasping parameters. These parameters include the locations where the human model grasps the tool model and the finger positioning on that object (i.e., the grasp itself). For instance, instantiating and positioning a digital human model (DHM) in a scene to simulate a manufacturing task typically requires specifying how to grasp the necessary tools.

While grasp is a popular topic in the field of digital human modeling, no solution exits which can automatically determine grasping for tools in a task-oriented way. Embodiments provide a solution to grasp tools using key points placed on the tools automatically. These key points mark important parts of the tool like the handle or the work vector. From these points, an optimal hand position is determined and additional tool degrees of freedom (DOF), other than the degrees of freedom of the digital human model joints, are specified to a solver which automatically postures a digital human model. These degrees of freedom can also be limited so that the grasp remains plausible.

Further, embodiments can determine hand grasp and whole-body posture for an object, e.g., digital human model. In digital human modelling, hand grasp and whole-body posture are often treated separately. Embodiments provide an approach for tool grasping that simultaneously optimizes hand grasp and whole-body posture using a flexible cylindrical hand-tool constraint. Results of one such embodiment, described below, compare the flexible cylindrical hand-tool constraint results to frame, hinge, and cylindrical constraint results of predicting hand grasp and whole-body posture of a digital human model for a virtual hammering task. Joint deviations from neutral, hand-tool pose deviation from a reference pose, and hand-pelvis distance are analysed for each constraint. The flexible cylindrical constraint provides a compromise between joint and hand-tool deviations and leads to the lowest hand-pelvis distance. The resulting hand grasp and whole digital human model posture are more adapted to the task and more ergonomically acceptable.

An example embodiment is directed to a computer implemented method of determining positioning of a mannequin, e.g., a digital human model, animal model, or robot model, amongst other examples. Such an embodiment begins by determining a frame of a grasping element of a mannequin represented by a computer-aided design (CAD) model and determining a frame of an object to be grasped. In such an embodiment, the object is represented by a CAD model. To continue, degrees of freedom of the mannequin are specified and limits on the specified degrees of freedom are set. In turn, using an inverse kinematic solver, positioning of the mannequin grasping the object is determined based upon: (i) the determined frame of the grasping element, (ii) the determined frame of the object, (iii) the specified degrees of freedom, and (iv) the set limits on the specified degrees of freedom.

In embodiments, the CAD model of the mannequin may represent any actor, articulating mechanism, or object capable of grasping. For instance, the CAD model may represent at least one of: a human, an animal, and a robot. Similarly, the CAD model of the object to be grasped may represent any item, element, or tangible object. For instance, in an embodiment, the CAD model of the object to be grasped represents a real-world tool, such as a hammer, pliers, or a drill, amongst other examples.

According to an embodiment, determining the frame of the grasping element comprises defining a frame at a center of prehension of the grasping element and relative to the defined frame, offsetting a virtual segment. According to an embodiment, a virtual segment is defined as a weightless mechanical entity of a variable length, in contrast to a real physiological segment, e.g., limb, with known weights and static length. In such an embodiment, the frame of the grasping element is provided at an end of the virtual segment as offset. In embodiments, the length of the offset may be based upon properties of the object being grasped. For example, in an embodiment, the length of the offset is a function of a radius of a cylinder approximating a handle of the object.

In a particular embodiment, the frame of the object to be grasped is determined by receiving indications of physical features of the object that indicate functionality of elements of the object and determining the frame of the object based upon the received indications. According to one such embodiment, the indications of physical features are grasping cues as described in U.S. Provisional Application No. 62/842,337, filed on May 2, 2019, and/or corresponding non-provisional application Ser. No. 16/864,484 "Extracting Grasping Cues From Tool Geometry For Digital Human Models" by Alexandre Macloud, Louis Rivest, Ali Zeighami, Pierre-Olivier Lemieux, Rachid Aissaoui.

Embodiments may use a plurality of degrees of freedom, alone or in combination. For instance, in embodiments, the specified degrees of freedom include as least one of: (1) rotation of the grasping element about an axis of the frame of the object to be grasped, (2) translation of the grasping element about an axis of the frame of the object, (3) a constraint on the inverse kinematic solver that an axis of the frame of the grasping element and an axis of the frame of the object coincide, (4) a constraint on the inverse kinematic solver of a neutral posture for the mannequin, (5) a frame constraint on the inverse kinematic solver, (6) a hinge constraint on the inverse kinematic solver, (7) a cylindrical constraint on the inverse kinematic solver, and (8) a flexible cylindrical constraint on the inverse kinematic solver.

Another embodiment further comprises receiving an indication of relative importance, i.e., a weight, for at least one of the degrees of freedom. In such an embodiment, the inverse kinematic solver can be further configured to determine the positioning of the mannequin based upon the received indication of relative importance for the at least one degree of freedom. Further, in such an example embodiment, the inverse kinematic solver is further configured to determine the positioning of the mannequin by optimizing posture of the mannequin. According to an embodiment, the optimal posture is obtained through the use of an objective function involving the degrees of freedom with the received indication of relative importance. Further, in yet another embodiment, the inverse kinematic solver is configured to determine the positioning of the mannequin by minimizing deviation of the mannequin from a neutral posture.

According to an embodiment, the determined positioning of the mannequin indicates position of the grasping element of the mannequin. For example, the positioning may indicate positioning of the grasping element in 3D space. Moreover, in an embodiment the determined positioning of the mannequin is global positioning of the mannequin in 3D space and positioning of the grasping element of the mannequin in 3D space.

In an embodiment, the degrees of freedom can be applied to any elements of the mannequin and/or object being grasped. For instance, in an embodiment, the degrees of freedom are applied to at least one of: the grasping element of the mannequin and a joint of the mannequin. In such an embodiment, the joints link segments, e.g., limbs, of the mannequin together.

Another embodiment determines closure of the grasping element around the object based on the determined positioning. In an embodiment, the closure is determined using a linear interpolation. Yet another embodiment associates, in computer memory, the determined positioning of the mannequin with the CAD model of the mannequin. In this way, the model of the mannequin with the associated positioning can be used in simulations. For instance, another example embodiment simulates real-world use of the object using the CAD model of the mannequin with the associated determined positioning. The results of this simulation can be used to modify real-world use of the tool by the human or object that the mannequin represents. Similarly, results of the simulation can be used to modify the environment, e.g., factory, in which the object that the mannequin represents operates. These modifications can improve the environment, for instance, by increasing efficiency of operations being performed or by modifying the environment or operations of the mannequin to reduce injuries or fatigue and improve ergonomics of performing a task.

Yet another embodiment of the present invention is directed to a system that includes a processor and a memory with computer code instructions stored thereon. In such an embodiment, the processor and the memory, with the computer code instructions, are configured to cause the system to implement any embodiments described herein.

Another embodiment is directed to a cloud computing implementation for determining positioning of a mannequin. Such an embodiment is directed to a computer program product executed by a server in communication across a network with one or more clients, where the computer program product comprises program instructions which, when executed by a processor, causes the processor to implement any embodiments described herein.

Further, it is noted that while embodiments are described herein as determining positioning for a human based upon geometry of a tool, embodiments are not so limited. Specifically, embodiments may be employed to determine positioning for any object, e.g., human, animal, and robot, amongst other examples, while grasping any object.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
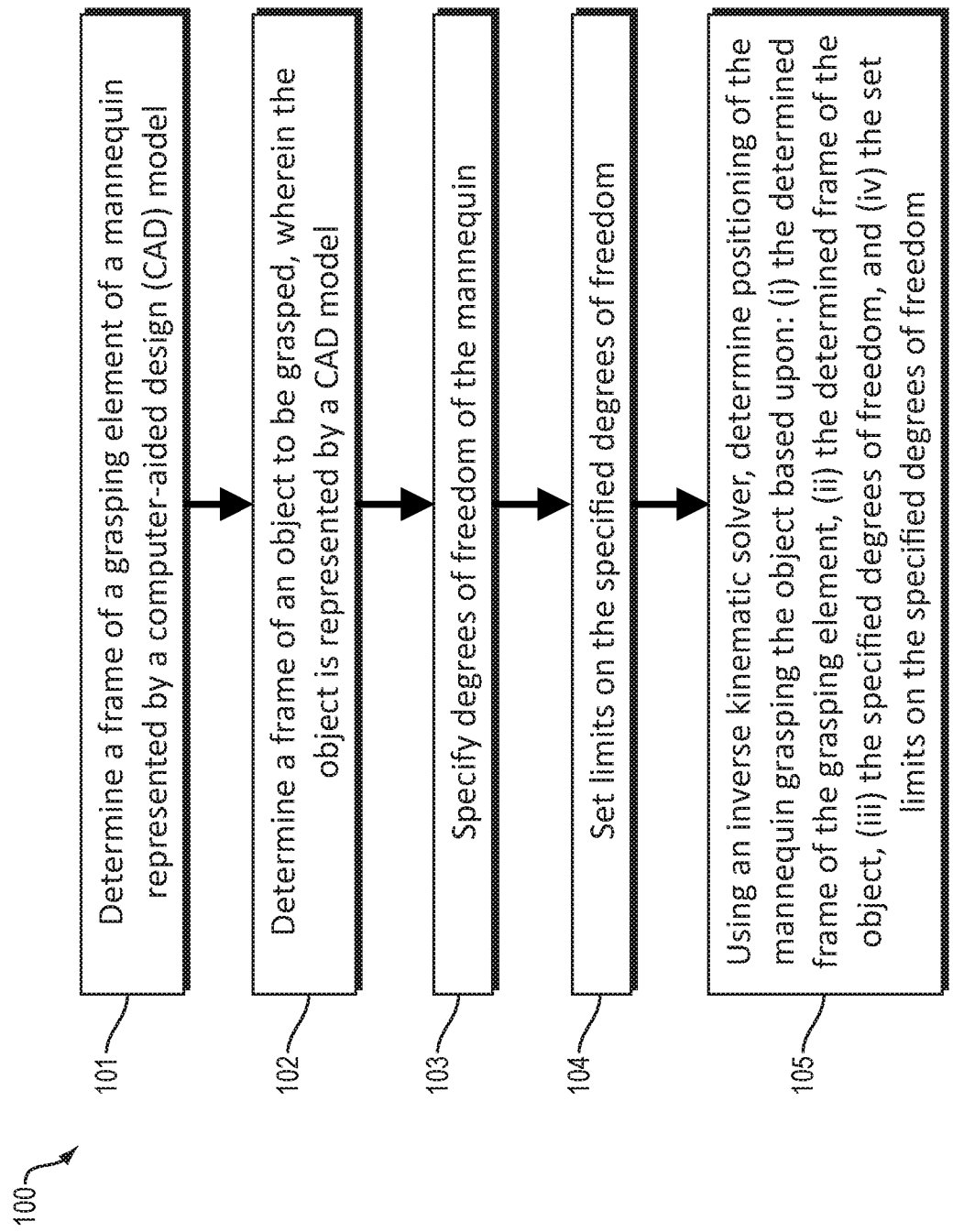
FIG. 1 is a flowchart of a method for determining positioning according to an embodiment.

A description of example embodiments follows.

Instantiating a digital human model in a scene to simulate a task, e.g., manufacturing, typically encompasses specifying a variety of aspects, such as the mannequin, i.e., digital human model, anthropometry, the 3D work environment, and the tools involved in the task. As such, performing these simulations requires determining positioning of the digital human model in the scene performing the task being simulated.

To instantiate a digital human model in a scene with minimal user input, Applicant has developed a new virtual mannequin posture solver called the Smart Posturing Engine (SPE). This solver is intended to simulate and validate task feasibility in a real-world environment, such as an automotive assembly line, by automatically posturing a virtual mannequin in the 3D virtual environment and the object(s) to grasp. The grasping functionality of the SPE automatically generates plausible hand and body posture for a given object while grasping using the functionality described herein. Embodiments can be employed in the SPE to determine hand and body posture. Further, it is noted that while embodiments are described as being employed in the SPE, embodiments are not so limited. Embodiments can be employed in any solvers and computer-implemented environments known in the art to determine hand and body posture and to perform simulations of real-world tasks.

Determining hand and body posture is an important aspect of modeling and, as such, other methods have been implemented to determine posture. However, these existing methods are inadequate. Embodiments provide significant improvements over existing functionality. Cutkosky [1] highlighted two approaches for grasping: analytical and empirical (bracketed numbers in this document refer to the enumerated list of references hereinbelow). El-Khoury [3] explains that analytical approaches refer to the methods that construct force closure grasps by computing kinematic and dynamic equations of the hand and finger position. Nguyen [13] developed efficient algorithms for force closure grasp of polygons and polyhedral. Unfortunately, analytical strategies suffer from computational complexity which prevents the analytical methods from determining task-oriented grasps.

Empirical approaches (data-driven) operate by analyzing object geometries and task manipulation. These empirical approaches can be divided into two categories, human observation and object observation.

Approaches based on human observation try to reproduce grasp from human demonstration using data-gloves [2, 9] or stereoscopy to track the demonstrator's hand performing a grasp [11]. The main problem with human observation based strategies is that they are not autonomous when facing a new object.

Object observation strategies try to generate multiple grasps on the object while keeping only the best one based on force closure and reachability aspects [12]. The object observation approaches do not take into account task oriented grasps. This is particularly problematic because task oriented grasps are common for digital human model grasping in many industrial contexts like simulated assembly lines.

Endo, et al. [6] proposed a solution to semi-automatically grasp a virtual object with a virtual hand model. The Endo solution estimates the grasp posture when grasping virtual objects like a cellphone. Endo requires the user to choose two pairs of points; two points on the object and two points on the hand mesh. Endo, et al. [6] then generates the grasp so that each pair of points coincide. A grasp is then generated by maximizing the contact between the hand and the object. Other approaches use the same strategy as in Endo [6] to grasp, with added metrics to evaluate the grasp posture [4-7]. The Endo solution is not fully automatic and only the hand posture is considered, and not the entire digital human model posture.

Goussous [10] proposed another digital human model grasp solution. The Goussous method manually generates a database of hand posture using forward kinematics. The Goussous method samples the object surface and uses a shape matching algorithm to find a hand posture in the database that best fits with the object geometry. The hand is then displaced to several parts of the object and oriented to maximize the contact. Several hand postures are then presented to the user, who choses one of them. In turn, the Goussous method generates the digital human model posture using the hand posture selected by the user. To generate the digital human model posture, Goussous [10] provides a final hand posture on an object to the posture solver to find the best digital human model posture given the determined hand configuration. This is problematic because there are several ways of grasping an object and it is difficult to end up with a realistic digital human model posture by only considering the hand for the grasp strategy.

Given the existing methods, some of which are described above, two particularly problematic issues have not yet been solved for virtually grasping a tool by a digital human model. The first problem is finding an appropriate way of grasping the tool which allows the use of the desired tool, i.e., task-oriented grasp. The second problem is that existing solutions always dissociate the hand position on the tool from the rest of the digital human model posture. Dissociating the hand position on the tool from the rest of the digital human model posture makes the existing solutions less likely to generate plausible digital human model postures.

Embodiments solve these problems by providing a grasp strategy that focuses on specifying the grasp input for the solver, e.g., SPE, that assures a task oriented-grasp on the object, e.g., tool, while providing degrees of freedom for the hand around the object.

In addition to determining grasp positioning, embodiments also determine whole-body positioning, i.e., posture, when grasping. Hand and whole-body posture are interrelated. During the grasping phase, the hand is constantly refining its pose (i.e., position and orientation) to ensure an optimal grasp for the intended action. Meanwhile, the position of the body is also refined in an attempt to reduce joint solicitation. In digital human modelling, hand positioning and whole-body posture are often predicted separately. First, the feet and hand are positioned and oriented in space. Thereafter, the fingers are closed using automatic hand closing algorithms (e.g. cylindrical, spherical, or pinches). These methods can get close to a plausible grasp and digital human model posture, however, back and forth manual adjustments of the hand, whole body posture, and grasp are often needed. These manual adjustments are complex to handle, time consuming, and require deep knowledge of the digital human model.

For instance, the approach of Zhou and Reed [27] requires the poses of the feet and hand(s) as inputs, which prevents their refinement during the posture prediction process. The plausibility of the final posture then depends on the plausibility of the imposed feet and hand poses. If the feet and hand poses are too restrictive, the rest of the body may not be able to be adjusted to improve the whole posture. This can flag a risk of musculoskeletal disorder (MSD) in a subsequent ergonomic analysis, which could be avoided by allowing more flexible feet and hand constraints.

As described above, many grasp generation methods have been proposed. Endo, et al. [6] proposed a method for grasping a virtual cellphone in a semi-automatic manner. Other approaches generate grasps based on human demonstration [11] or object segmentation using shape primitives [12]. These approaches select one out of a large set of possible grasps, based on object geometry, force closure metrics, and reachability aspects. Other approaches for grasping objects from daily living (e.g. bottles, teapots, mugs, keys, and sunglasses) use analytical methods that generate force closure grasps using kinematic and dynamic equations of the hand and finger positions [17]. None of the above-mentioned approaches account for the tool geometrical features and the performed action. Consequently, the application of these existing methods to tool grasping may not lead to plausible grasp for the intended action. Moreover, the existing methods do not simulate the link between the hand positioning and the whole digital human model posture. Some of these approaches even require user intervention to select one of the possible grasps, which makes the final grasp, hand positioning, and the whole digital human model posture user-dependent and not repeatable.

Moreover, a majority of existing grasp generation methods have been developed for objects. However, many manufacturing tasks are performed using tools. A tool is a special kind of object that contains specific geometrical features (e.g. handle, head, working tip) that afford defined ways to grasp the tool in accordance with the task (e.g. use, move, hold). This "task-oriented" tool grasping is not well covered in the literature.

Embodiments solve the aforementioned problems and provide an approach for digital human modelling task-oriented tool grasping that simultaneously optimizes hand and whole-body positioning. The simultaneous optimization is made possible through the creation and use of a flexible cylindrical constraint between the hand and the tool. In an embodiment, the range of motion of the additional degree of freedom provided by this constraint is limited with respect to the tool geometrical features and intended action. By using this constraint and the associated limitations, embodiments determine a more ergonomically acceptable posture by minimizing the deviation of specific joints from a neutral posture. This minimization is possible because the kinematic root of the digital human model can move and the feet are not fixed.

FIG. 1 is a flowchart of a method 100 for determining positioning of an object, e.g., mannequin, according to an embodiment. The method 100 begins by determining 101 a frame of a grasping element of a mannequin represented by a CAD model. In an example embodiment, the frame for the grasping element is determined at step 101 as described hereinbelow in relation to FIGS. 4A, 4B, FIG. 6 and FIGS. 20A and 20B.

The method 100 next determines 102 a frame of an object to be grasped where the object is represented by a CAD model. According to an embodiment, the frame for the object to be grasped may be determined at step 102 as described hereinbelow in relation to FIG. 7, FIG. 8, and FIG. 19. In embodiments, the frames determined at steps 101 and 102 are cartesian coordinate frames.

Returning to the method 100, degrees of freedom on the tool are specified at step 103. In embodiments the degrees of freedom may be specified at step 103 based upon user input. In an embodiment the degrees of freedom are previously defined. According to an embodiment, the pre-defined degrees of freedom may be identified through trial and error and inspection of resulting grasps from the trials. Further, in an embodiment, the degrees of freedom may be stored in a database that contains the CAD model of the tool along with the grasping cues of the tool. The degrees of freedom may be the degrees of freedom as described below in relation to FIG. 2.

Next, at step 104, limits on the specified degrees of freedom are set 104. According to an embodiment of the method 100, the limits are specified based upon user input. In an embodiment, the limits on the degrees of freedom are previously set and this information may be stored in database. Examples of limits on degrees of freedom that may be specified at step 104 are described below in relation to FIGS. 10, 21, 22A, and 22B.

In turn, using an inverse kinematic solver, positioning of the mannequin grasping the object is determined at step 105 based upon: (i) the determined frame of the grasping element, (ii) the determined frame of the object, (iii) the specified degrees of freedom, and (iv) the set limits on the specified degrees of freedom. In an embodiment, the determined positioning is positioning in three-dimensional space. Embodiments may utilize any kinematic solver known in the art, such as the SPE developed by the applicant. An example kinematic solver that may be used in embodiments is described hereinbelow.

In the method 100, the CAD models of the mannequin and the object may be any such CAD models known in the art. Moreover, the mannequin and object may be represented by distinct and separate CAD models, or they may each be represented by sub-models of a CAD model that, for example, represents an environment in which the mannequin operates. Further, the CAD model of the mannequin may represent any object capable of grasping. For instance, the CAD model may represent at least one of: a human, an animal, and a robot. Similarly, the CAD model of the object may represent any object. For instance, in an embodiment, the CAD model of the object represents a real-world tool, such as a hammer, pliers, or a drill, amongst other examples.

According to an embodiment, the frame of the grasping element is determined at step 101 by defining a frame at a center of prehension of the grasping element and relative to the defined frame, offsetting a virtual segment. In such an embodiment, the frame of the grasping element is provided at an end of the virtual segment as offset. In one such embodiment, the length of the offset is based upon properties of the object being grasped. For instance, in an example embodiment, the length of the offset is a function of a radius of a cylinder approximating a handle of the object.

In a particular embodiment, the frame of the object is determined at step 102 by receiving indications of physical features of the object that indicate functionality of elements of the object and, in turn, determining the frame of the object based upon the received indications. According to an embodiment, the indications of the physical features are grasping cues determined as described in U.S. Provisional Application No. 62/842,337, filed on May 2, 2019, and/or non-provisional application Ser. No. 16/864,484 "Extracting Grasping Cues From Tool Geometry For Digital Human Models" by Alexandre Macloud, Louis Rivest, Ali Zeighami, Pierre-Olivier Lemieux, Rachid Aissaoui.

A plurality of degrees of freedom may be specified at step 103. For instance, in embodiments, the degrees of freedom specified at step 103 include as least one of: (1) rotation of the grasping element about an axis of the frame of the object, (2) translation of the grasping element about an axis of the frame of the object, (3) a constraint on the inverse kinematic solver that an axis of the frame of the grasping element and an axis of the frame of the object coincide, (4) a constraint on the inverse kinematic solver of a neutral posture for the mannequin, (5) a frame constraint on the inverse kinematic solver, (6) a hinge constraint on the inverse kinematic solver, (7) a cylindrical constraint on the inverse kinematic solver, and (8) a flexible cylindrical constraint on the inverse kinematic solver. In embodiments, the degrees of freedom may be used alone or in combination.

Further, in an embodiment, the degrees of freedom specified at step 103 can be applied to any elements of the mannequin and/or object being grasped. For instance, in an embodiment, the degrees of freedom are applied to at least one of: the grasping element of the mannequin and a joint of the mannequin. In such an embodiment, the joints link segments, e.g., limbs, of the mannequin together. Further, in an embodiment, the elements of the mannequin on which to apply the degrees of freedom is also be specified.

An embodiment of the method 100 further comprises receiving an indication of relative importance, i.e., a weight, for at least one of the degrees of freedom specified at step 103. In embodiments, an indication of relative importance for any number of degrees of freedom may be received or specified. In one such embodiment, the inverse kinematic solver used at step 105 is configured to determine the positioning of the mannequin based upon the received indication(s) of relative importance. In such an example embodiment, the inverse kinematic solver can be further configured to determine the positioning of the mannequin by optimizing posture of the mannequin that is defined by an objective function representing the degrees of freedom with the received indication of relative importance. In other words, in such an embodiment, the inverse kinematic solver applies the specified weights to the appropriate degrees of freedom through use of an objective function. Further, in yet another embodiment, the inverse kinematic solver is configured to determine the positioning of the mannequin at step 105 by minimizing deviation of the mannequin from a neutral posture.

According to an embodiment of the method 100, the positioning of the mannequin determined at step 105 indicates position of the grasping element of the mannequin. For example, the positioning may indicate positioning of the grasping element in 3D space. Moreover, in an embodiment the positioning determined at step 105 is global positioning of the mannequin in 3D space and positioning of the grasping element of the mannequin in 3D space.

Another embodiment of the method 100 determines closure of the grasping element around the object based on the positioning determined at step 105. In an embodiment, the closure may be determined using a linear interpolation. Yet another embodiment of the method 100 associates, in computer memory, the positioning of the mannequin determined at step 105 with the CAD model of the mannequin. In this way, the model of the mannequin with the associated positioning can be used in simulations. As such, another embodiment of the method 100 simulates real-world use of the object by utilizing the CAD model of the mannequin with the associated positioning that was determined at step 105.

Grasp Definition

Embodiments determine positioning of an object, e.g., mannequin, for grasping another object, e.g., a tool. In an embodiment, first, the grasping element, e.g., hand, is positioned on the object and then, the object is closed around the object. For the example of a hand, the hand is positioned on the object and, in turn, the fingers are closed around the object.

Figure 2:
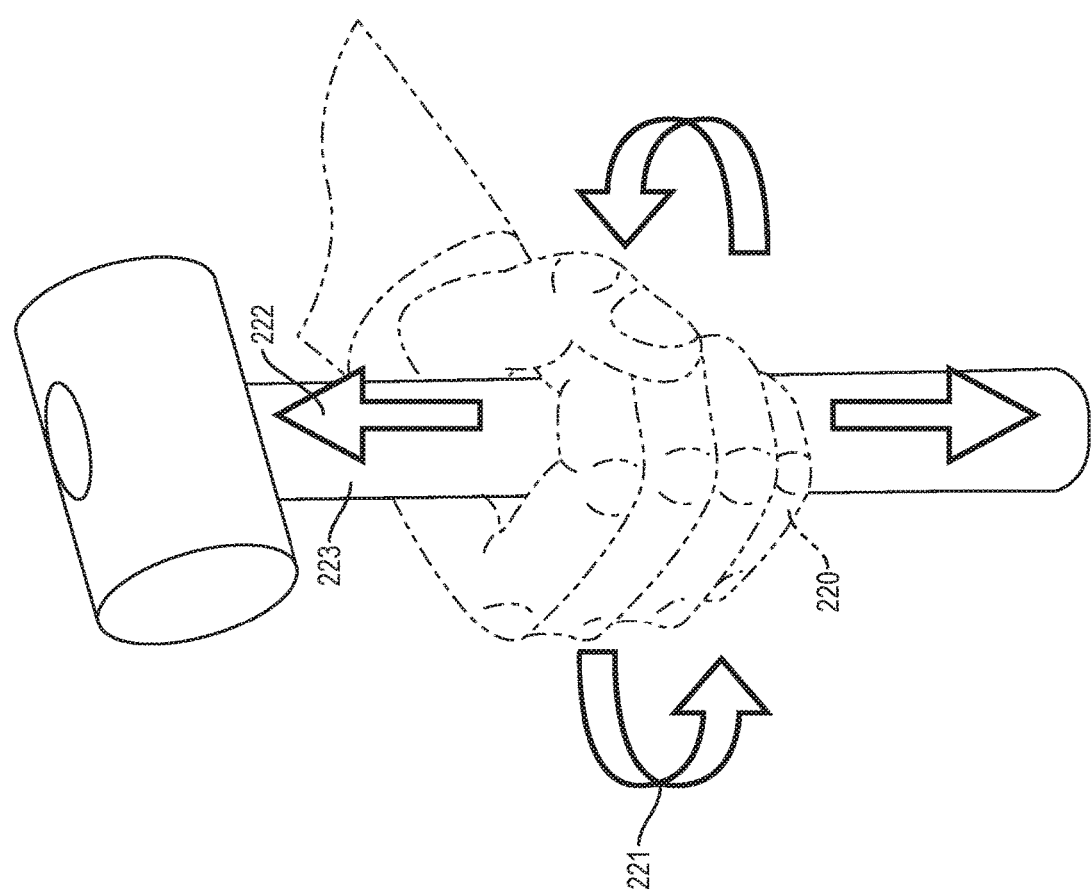
FIG. 2 illustrates degrees of freedom that may be employed in embodiments.
Figure 3B:
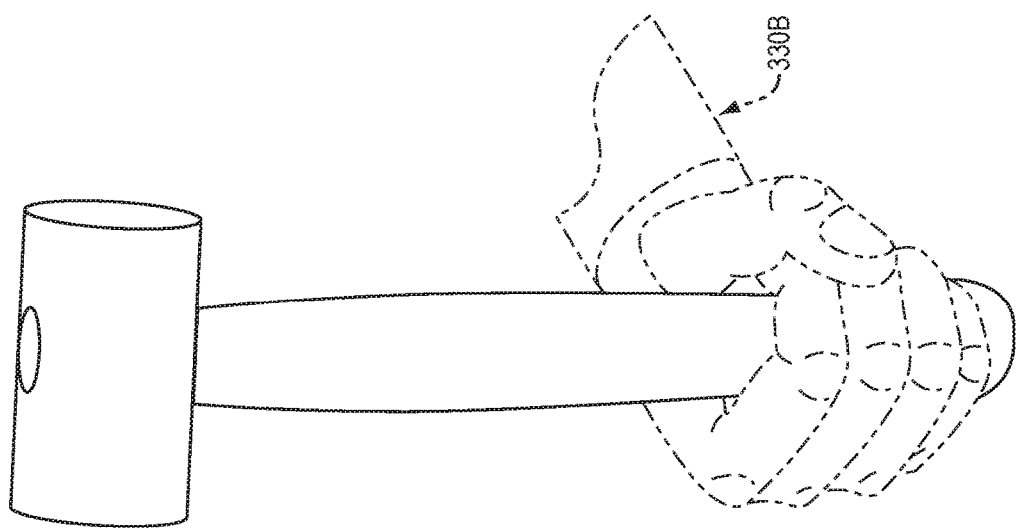
FIGS. 3A and 3B depict hand positions that may be determined using embodiments.
Figure 3A:
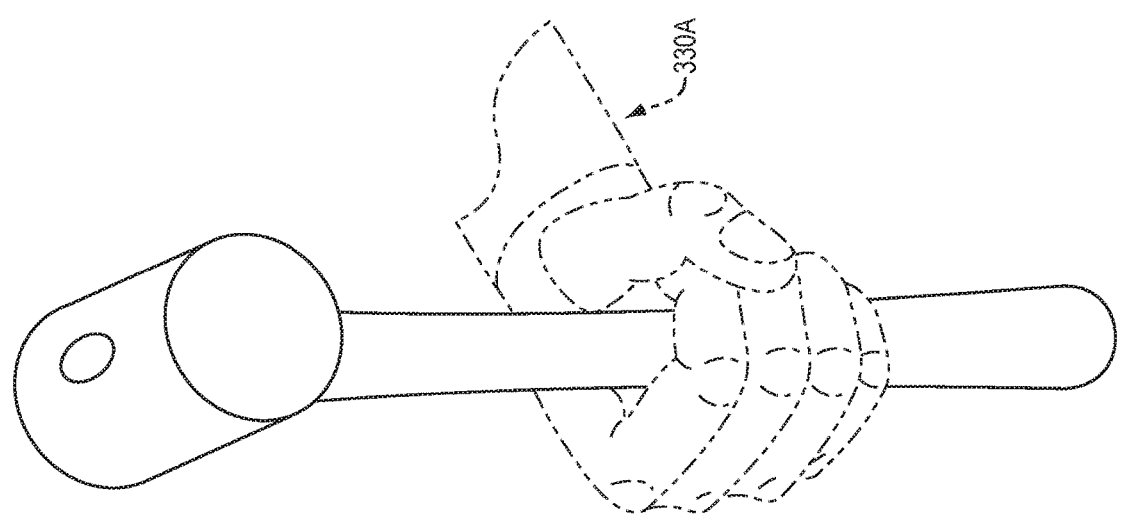

The objective of an embodiment is automatically placing the hand on the tool to grasp. A significant difference between existing methods and embodiments of the present invention is that in embodiments, the hand can move around the object given some degrees of freedom. In an example embodiment, the hand can rotate around and translate along the handle axis being grasped. FIG. 2 depicts these degrees of freedom where the hand 220 can rotate 221 around the handle axis 223 and, likewise, the hand 220 can translate 222 along the handle axis 223. By allowing these degrees of freedom, translation 222 and rotation 221, embodiments can determine a variety of different hand postures. FIGS. 3A and 3B illustrates example hand postures 330a and 330b, respectively, that can be determined in embodiments by employing the rotation 221 degree of freedom and translation 222 degree of freedom.

Figure 4B:
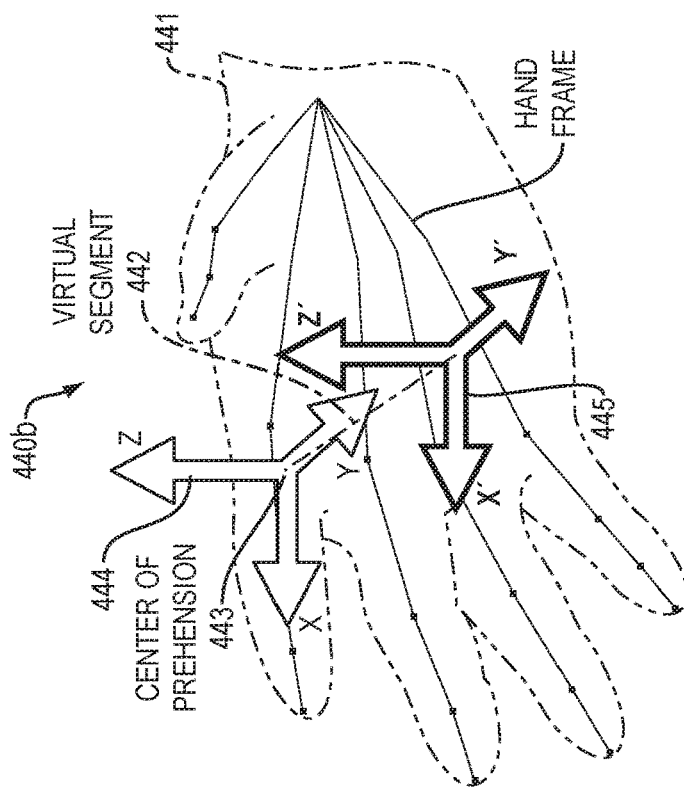
FIGS. 4A and 4B illustrate frames determined in embodiments.
Figure 4A:
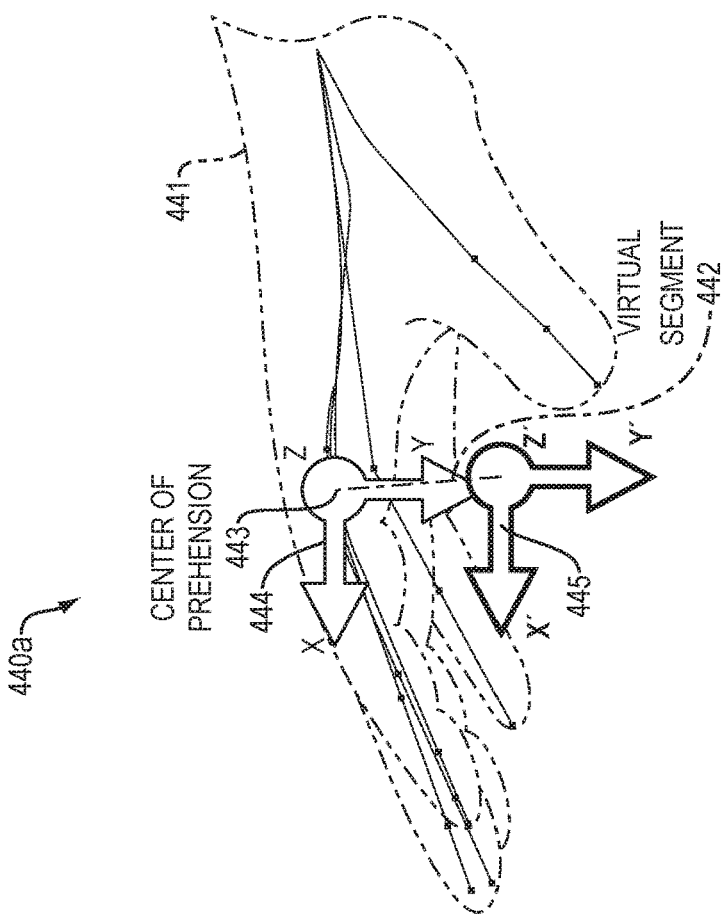

To determine a grasping element, e.g., hand, position with the aforementioned degrees of freedom, embodiments, use a "virtual segment." FIG. 4A is a top view 440a showing a model of a hand 441 and a virtual segment 442. FIG. 4B is an isometric view 440b of the model of the hand 441 and the virtual segment 442. Unlike a digital human model segment that represents a skeleton segment, the virtual segment 442 of the hand 441 employed in embodiments is an offset from the hand palm which allows the hand to rotate around the object being grasped without colliding with the object geometry. According to an embodiment, the virtual segment 442 is defined relative to the center of prehension 443 of the hand 441. In the embodiment depicted in FIGS. 4A and 4B, the center of prehension 443 is at the index proximal joint.

In embodiments, the center of prehension 443 has an associated frame 444, i.e., a cartesian coordinate reference frame. Likewise, the virtual segment 442 has a frame 445 at its end. In embodiments, the frame 445 at the end of the virtual segment 442 is used as the frame for the grasping object, e.g., the hand 441.

Figure 5B:
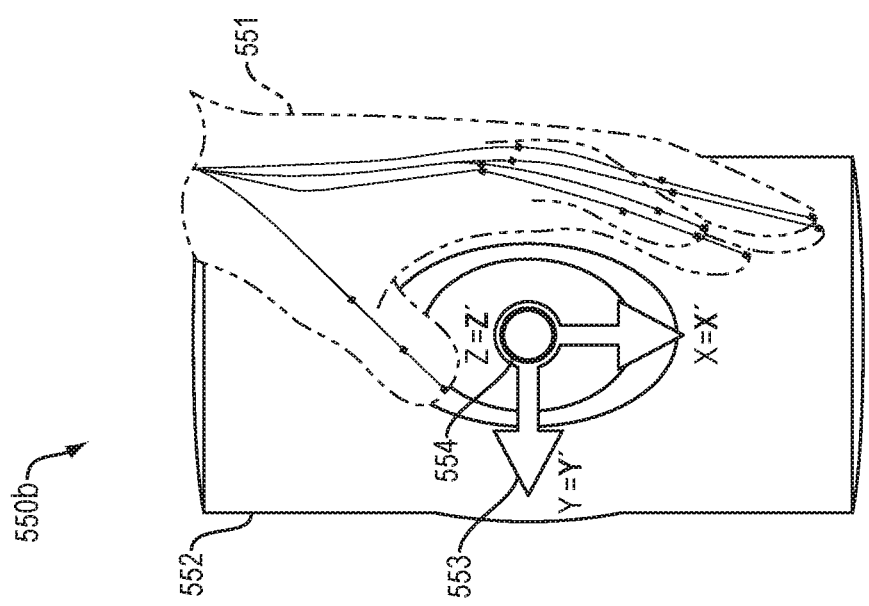
FIGS. 5A and 5B depict stages of solving hand positioning according to an embodiment.
Figure 5A:
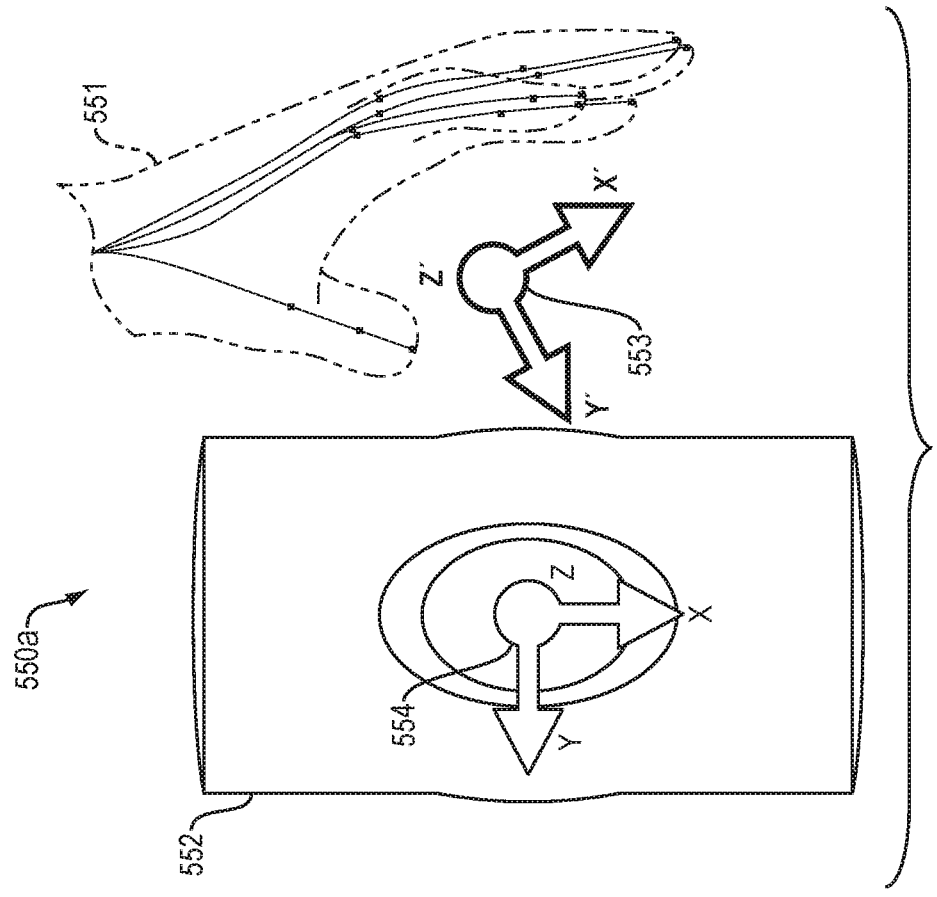
Figure 6:
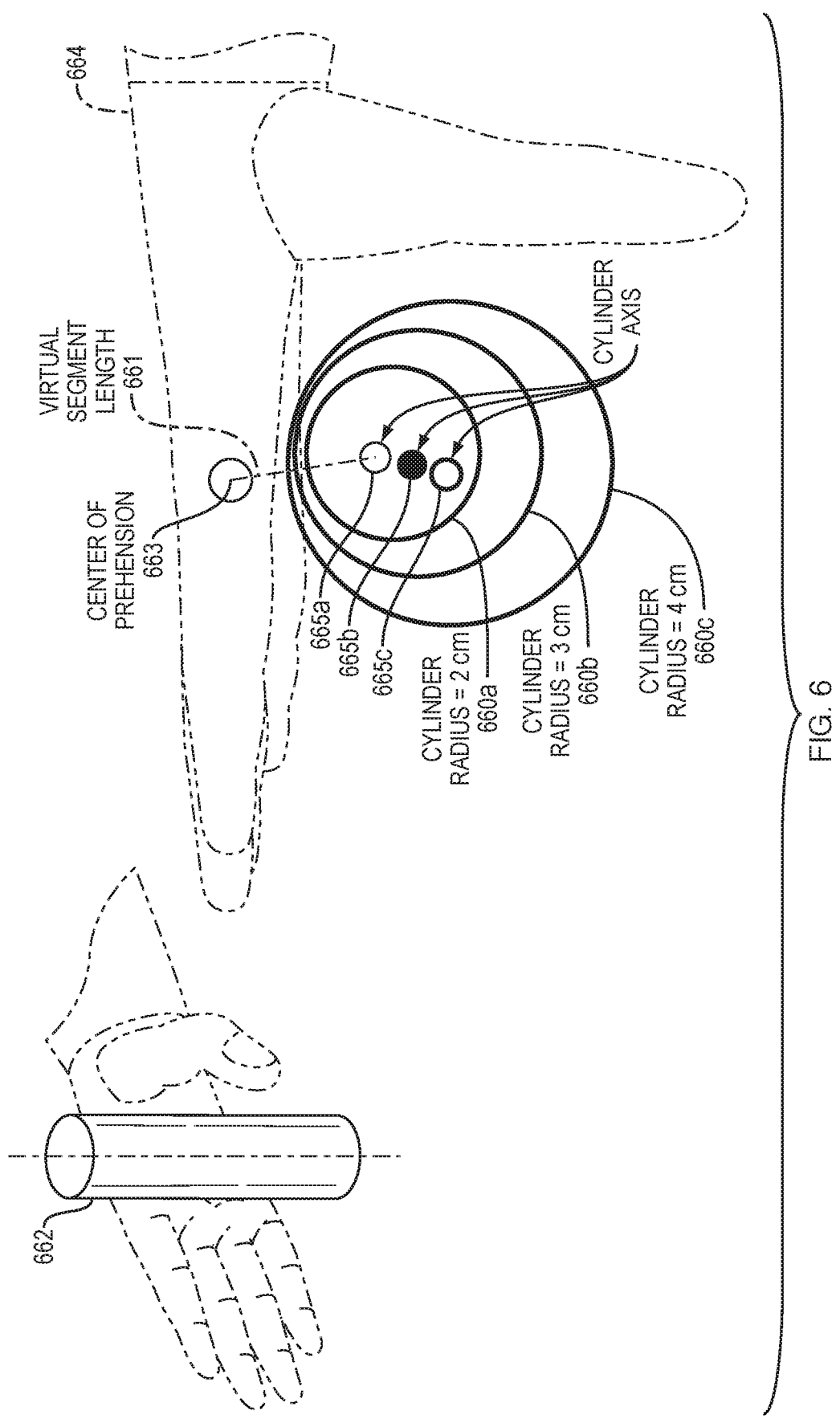
FIG. 6 illustrates a process of determining a virtual segment length utilized in embodiments.

FIGS. 5A and 5B illustrate stages 550a and 550b of solving hand positioning according to an embodiment. FIG. 5A illustrates the initial stage 550a with the frame 553 for the hand 551 and the frame 554 for the tool 552. In an embodiment, when grasping occurs the frame 553 for the hand 551 is coincident with the object target frame, i.e., the frame for the tool 554, when the hand 551 is grasping the tool 552. The stage 550b of FIG. 5B illustrates the solved position of the hand 551 on the tool 552 where the frame for the hand 553 and the frame for the tool 554 coincide.

To be able to determine the grasping, e.g., the hand 551 grasping the tool 552 as depicted in FIG. 550B, two parameters are determined: (i) the virtual segment position and orientation relative to the center of prehension and (ii) the target frame on the tool to grasp.

Virtual Segment Length

The virtual segment is used to put a distance between the hand and the target frame, so that the hand does not penetrate the tool while reaching the target. To ensure that the hand does not penetrate the target, the virtual segment length changes depending on the size of the object being grasped, e.g., the size of the tool handle. In the embodiment depicted in FIG. 6, to determine the length of the virtual segment 661 the handle is approximated with a cylinder 662. Depending on the radius 660a-c of the cylinder 662, the length of the virtual segment 661 changes so that the virtual segment goes from the center of prehension 663 of the hand 664 to the center axis 665a-c of the cylinder. As such, the bigger the radius 660a-c of the cylinder 662 the longer the virtual segment 661 length. In an embodiment, the orientation of the virtual segment is determined using the geometry of the hand. According to an embodiment, the orientation allows a slight contact of the hand palm with the handle while avoiding unrealistic penetration of the hand palm inside the tool handle. In one such embodiment, this condition is obtained by orienting the first virtual segment so that its Y-axis is parallel to the hand palm defined by the MP2, MP5 and CMC5 joints, examples of which are shown in FIG. 21. Further details of the relative pose of the virtual segment is described hereinbelow in relation to FIGS. 20A-B.

An example embodiment utilizes modeling performed using an existing CAD environment, e.g., DASSAULT SYSTEMES® CATIA V5. This modeling determines grasping cylinders of different radii (1.5, 2, . . . , 5 cm). Using this determined grasping, the position of the cylinder axes relative to the center of prehension frame was measured for each cylinder to determine the appropriate length and orientation for a virtual segment in each example case. When grasping a tool, the cylinder approximating the handle is automatically calculated. For instance, the cylinder may be calculated using the grasping functionality described in U.S. Provisional Application No. 62/842,337, filed on May 2, 2019, and/or non-provisional application Ser. No. 16/64,484 "Extracting Grasping Cues From Tool Geometry For Digital Human Models" by Alexandre Macloud, Louis Rivest, Ali Zeighami, Pierre-Olivier Lemieux, Rachid Aissaoui During operation, the pre-determined positions, i.e., virtual segment lengths and orientations, are searched to find the virtual segment positioning for a cylinder with a radius matching the radius of the cylinder that is approximating the handle for which grasping positioning is being determined. As such, from the predefined cylinder positions, it is then possible to determine the relevant virtual segment length, along with its relative position and orientation with respect to the wrist to be used when grasping the tool.

To illustrate, before the modeling, manual grasp for a cylinder with a 2 cm radius is determined. This includes determining the positioning, including a frame for the cylinder and a virtual segment connecting the center of prehension of the hand to the cylinder. This information is stored in a database or other computer memory. During operation, a cylinder approximating the tool handle is automatically determined, in this example, it is 2 cm cylinder. In turn, the previously identified frame and virtual segment length for the 2 cm cylinder is obtained from the database and used in the current modeling task.

Tool Frame

Figure 7:
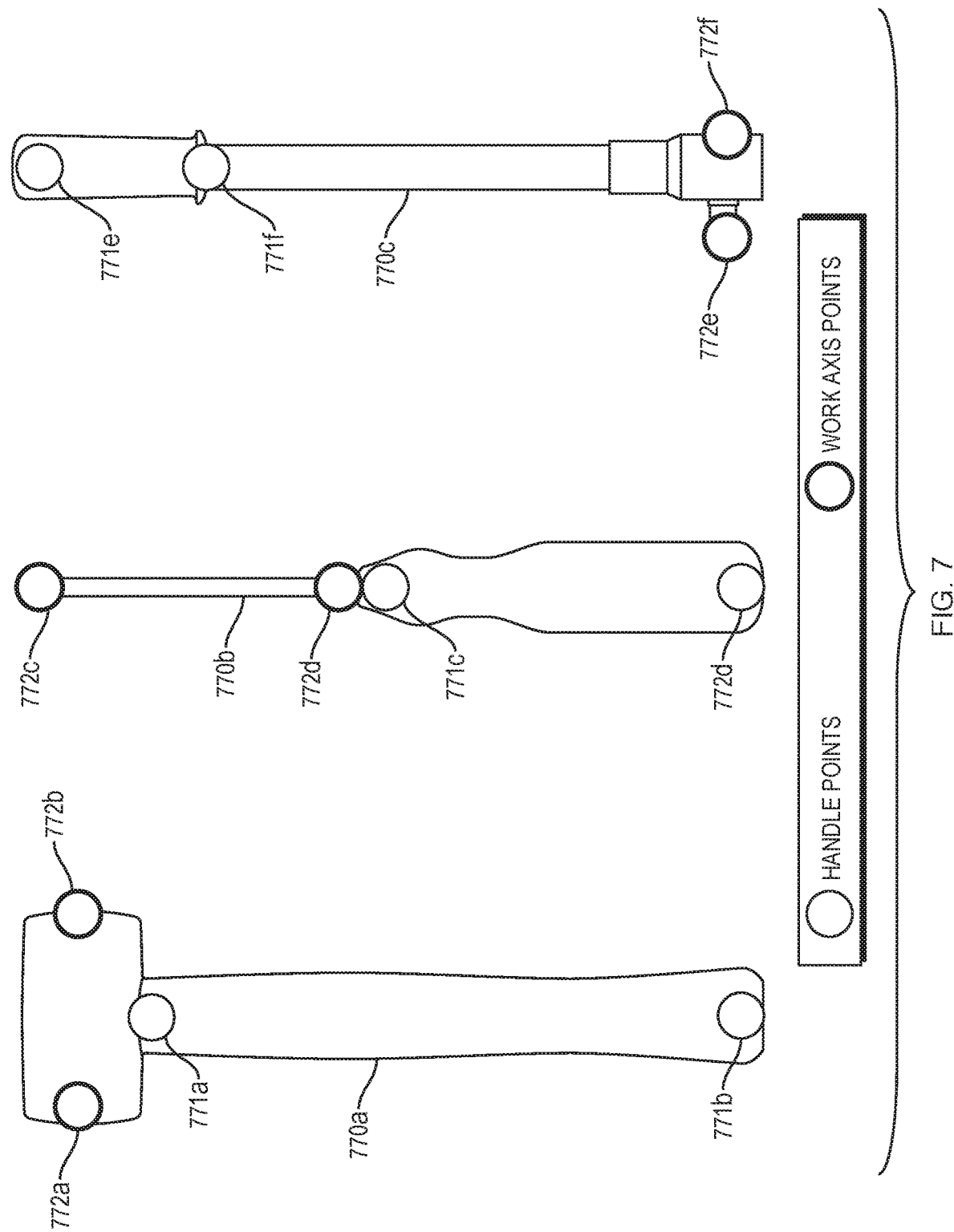
FIG. 7 depicts tools and associated key points on the tools that may be used to determine positioning according to embodiments.

To determine the right target frame for the tool, key points are defined on the tool to locate specific parts of the tool like the handle and the working axis. FIG. 7 illustrates a hammer 770a, screwdriver 770b, and torque wrench 770c with handle points 771a-f and working points 772a-f placed on the tools. In embodiments, these points 771a-f and 772a-f can either be placed manually on the 3D virtual tool models or automatically using the functionality described in U.S. Provisional Application No. 62/842,337, filed on May 2, 2019, and/or non-provisional application Ser. No. 16/868, 484 "Extracting Grasping Cues From Tool Geometry For Digital Human Models" by Alexandre Macloud, Louis Rivest, Ali Zeighami, Pierre-Olivier Lemieux, Rachid Aissaoui, the contents of which are herein incorporated by reference.

Figure 8:
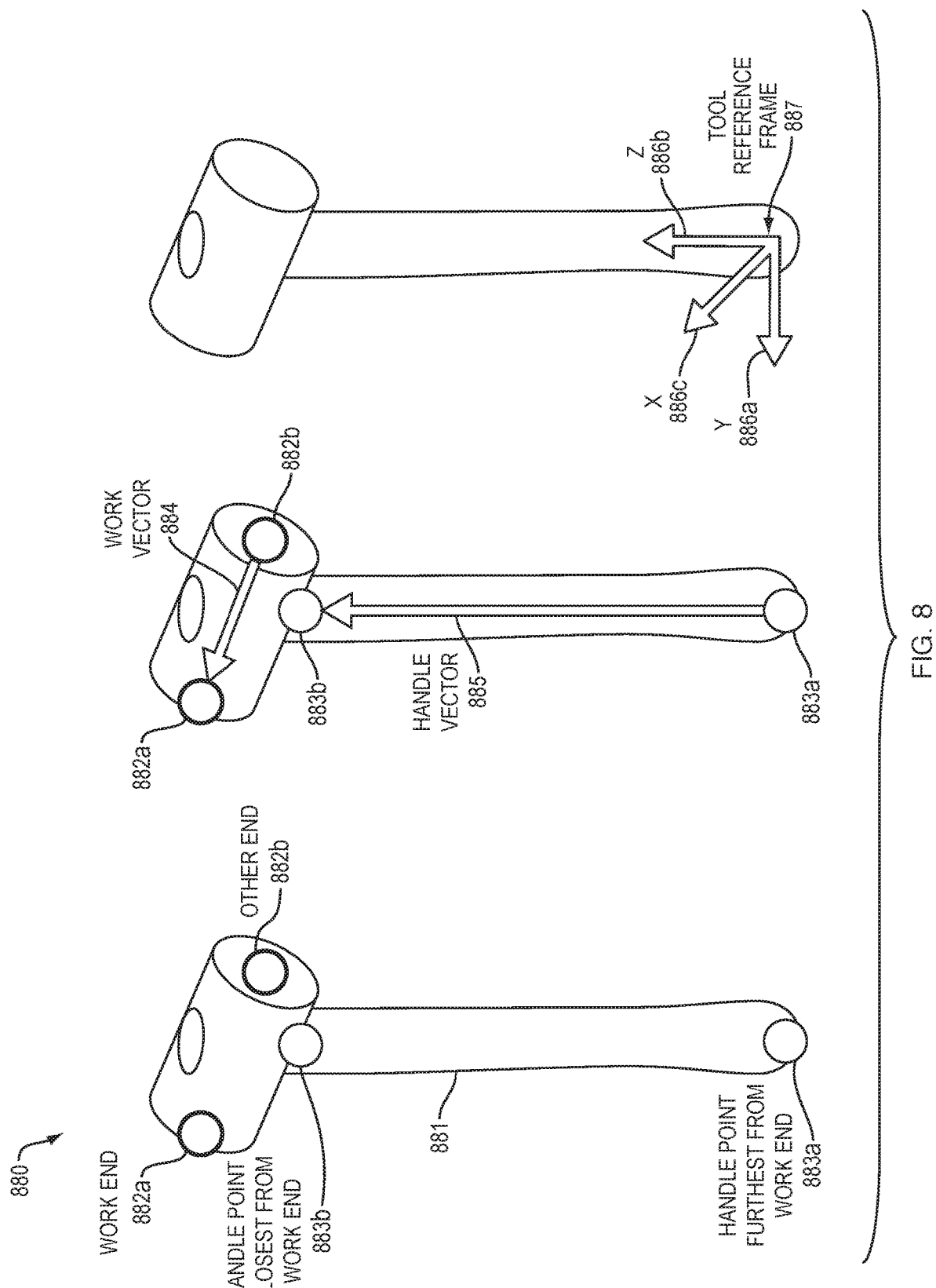
FIG. 8 illustrates a process to determine the frame for a tool according to an embodiment.

Embodiments create the tool reference frame using the tool key points, e.g., indications of handles, triggers, and/or working points of tools. FIG. 8 illustrates a process 880 to determine the frame 887 for a tool 881 according to an embodiment. The method begins with the tool model 881 that has working points including a working end 882a and a non-working end 882b. The tool model 881 also includes handle points comprising a handle point 883a that is furthest from the working end and a handle point 883b that is closest to the working end of the tool 881. To continue, two vectors are defined, a handle vector 885 and a work vector 884, using the handle points 883a-b and working points 882a-b, respectively. The handle vector 885 goes from the handle point 883a furthest from the working end to the handle point 883b closest to the tool's work end. The working vector 884 goes from the other tool end working point 882b to the working end point 882a. In turn, the reference frame 887 is determined. The first frame vector calculated is the Y axis 886a which is the cross product of the handle vector 885 and the work vector 884. The next frame vector that is determined is the Z axis 886b which is defined as the handle vector 885. Finally, the last frame vector determined is the X axis 886c which is formed as the cross product of the Y axis 886a and the Z axis 886b. If the work vector and the handle vector are parallel, then only the Z vector 886b is aligned with the handle vector 885 and the X vector 886c and Y vector 886a can be randomly oriented.

Embodiments utilize an inverse kinematic solver, such as the aforementioned SPE, to automatically determine positioning, i.e., posture, of the digital human model. Embodiments can specify the degrees of freedom on the grasping element, e.g., hand, when grasping an object. To illustrate the example of grasping a tool with a hand, given the obtained tool reference frame, rotation and translation axes are specified to the inverse kinematic solver to have a flexible grasp. Further functionality of the inverse kinematic solver is described hereinbelow. For the tools presented in FIG. 7 two degrees of freedom are allowed to the hand on the handle, rotation about the handle, and translation along the handle.

Figure 9:
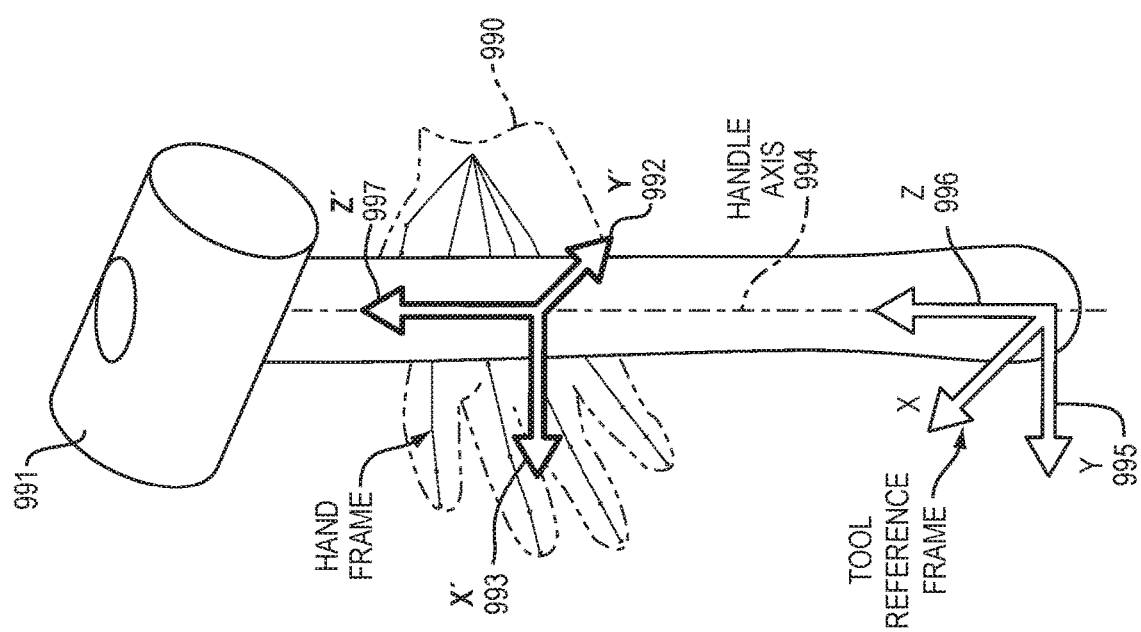
FIG. 9 shows hand position on a tool determined using an embodiment.

FIG. 9 illustrates an example of determined position of the hand 990 on the hammer 991 handle 992 given the specified degrees of freedom, translation and rotation of the virtual segment end effector which is represented by the reference frame 993 on the handle axis 994 which has the reference frame 995. In the example depicted in FIG. 9, when solving the hand posture, the solver can translate and rotate the hand on the handle axis 994. A constraint to the solver is to always have Z 996 and Z' 997 coincident.

Degree of Freedom Limitation

Figure 10:
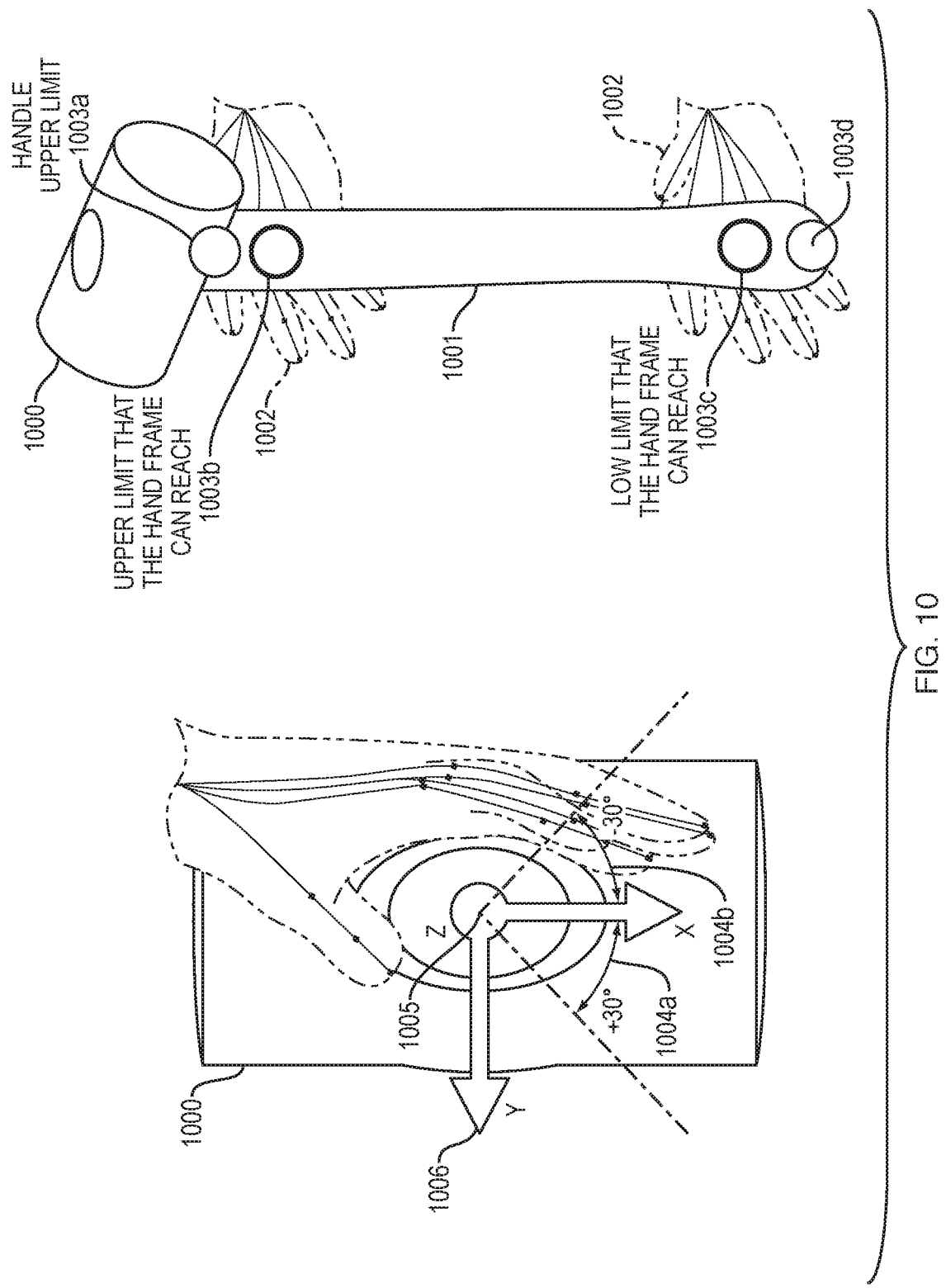
FIG. 10 illustrates limitations on degrees of freedom for a tool that may be implemented in embodiments.

With the degrees of freedom, the grasping element, e.g., hand, has a flexible position and orientation on the tool. However, to ensure the plausibility of the tool grasp, embodiments can specify limitations on the degrees of freedom to the inverse kinematic solver. FIG. 10 illustrates degree of freedom limitations for a tool 1000 that may be implemented in embodiments. For example, the translation of the hand 1002 on the handle axis 1001 is limited so that the hand 1002 does not go beyond the handle limits 1003a and 1003d. To do so, the limit points 1003a-d are specified on the handle 1001 axis. The limit points 1003b and 1003c represent the upper and lower limits of the hand frame on the handle 1001. The limit points 1003a and 1003d are the bounds of the handle itself. In an embodiment, the handle limit points 1003a-d are directly sent to the posture solver to constrain the solver to determine positioning that conforms to the limits 1003a-d.

Other constraints that can be added to the solver are the rotation limits 1004a-b around the handle axis 1005. With the rotation limit constraints 1004a-b, the hand frame 1006 can rotate around the Z axis according to maximum and minimum limits. In the example given in FIG. 10 the hand can rotate around the Z axis (which is coincident with the handle axis 1005) but not more than ±30° (the limitations 1004a-b) from the defined frame 1006.

Optimal Posture

Another input that can be specified to the inverse kinematic solver to determine positioning of the mannequin is an optimal hand posture on the tool. This constraint can be coupled with the other rotation and translation limits. In such an embodiment, when grasping the tool, the solver will try to determine a grasp for the tool given the optimal hand posture, but if the optimal hand posture cannot be achieved, the solver will move the hand given the degrees of freedom and limits thereon allowed. In an embodiment, the solver will try to find the best compromise between the optimal all body posture and optimal hand posture.

Figure 11:
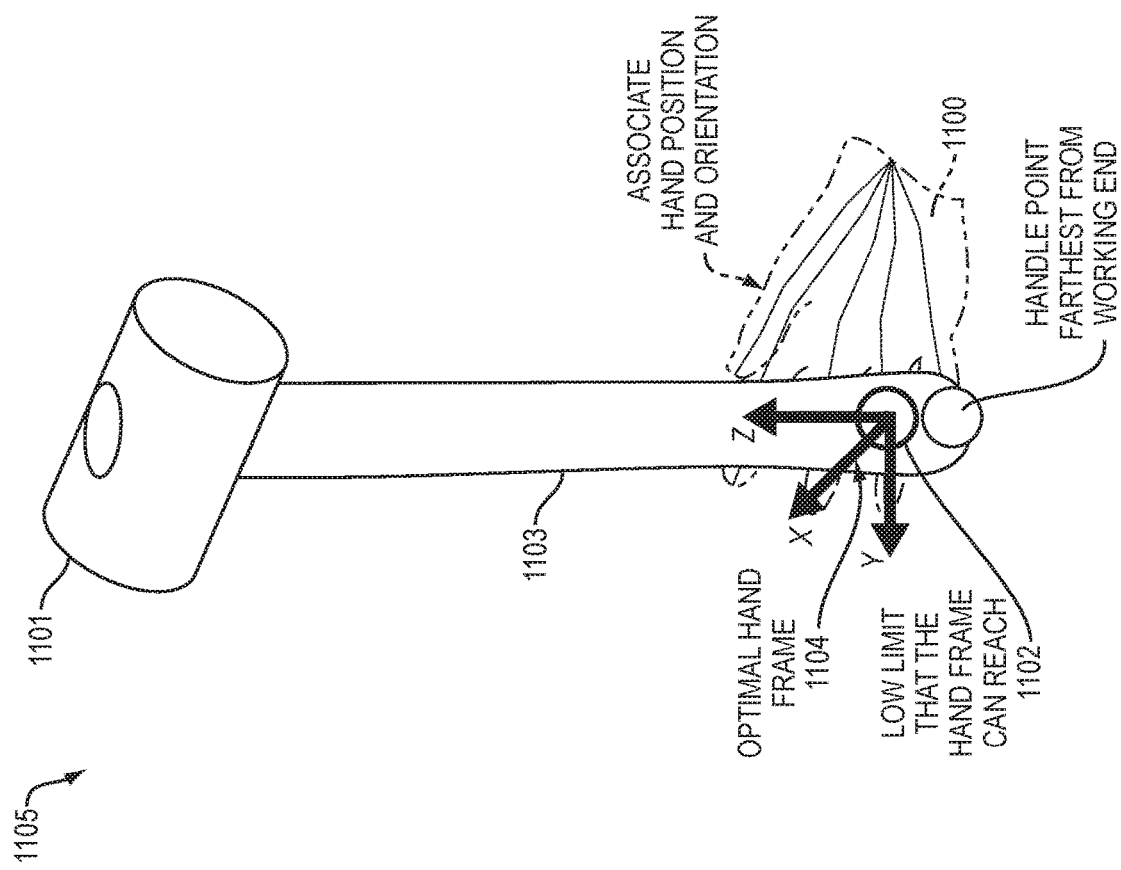
FIG. 11 depicts an optimal posture on a tool that may be used as a constraint in embodiments.

FIG. 11 shows an example of an optimal posture 1105 of the hand 1100 on the hammer 1101. In this case, the optimal hand position 1105 for the hand 1100 is defined at the low limit 1102 of the handle 1103 to maximize the punch force of the hammer 1101 head. The hand orientation, given by the hand frame 1104 is aligned with the work axis of the hammer 1101 so that the force applied on the hand 1100 is aligned with the hand palm.

Hand Closure

Figure 12:
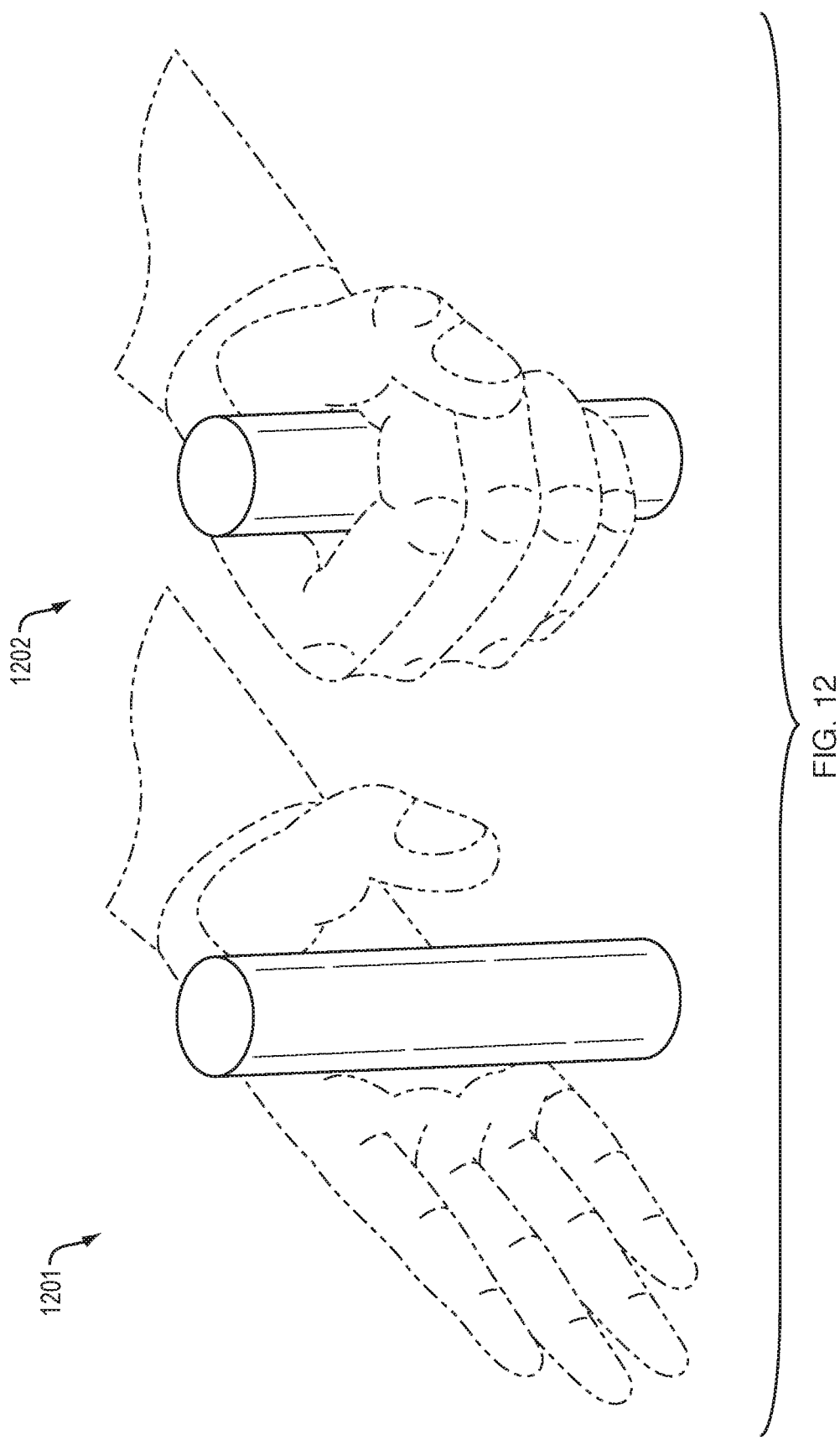
FIG. 12 illustrates stages of a hand closure method that are employed in an embodiment.

Once the hand is correctly positioned on the tool, such as the position 1105 depicted in FIG. 11, the fingers are closed around the tool. FIG. 12 illustrates stages 1201 and 1202 of a closing method that may be employed in embodiments. The example embodiment illustrated in FIG. 12 implements a closing method that performs a linear interpolation between an open hand configuration 1201 and a closed hand configuration 1202. The embodiment depicted in FIG. 12 determines hand closure on a tool that can be grasped like a cylinder, and as such, the closed configuration 1202 is when grasping the smallest cylinder.

At each step of the linear interpolation, the method checks for collision between each finger phalanxesis and the object. If the proximal phalange of the finger is in collision, the phalanx closure stops, but the finger medial and distal phalanx continues to close until colliding with the tool model, e.g., mesh. If the middle or distal phalanxes are in collision, then the closure for these phalanxes and its proximal phalanx is stopped. This process is applied to each finger until a collision with the tool happens or until the maximal closing is reached. In an embodiment, spheres are used to approximate the mesh of the grasping element, e.g., mannequin mesh, and to check for collisions between the mesh of the grasping element and the object being grasped.

Results

Figure 13:
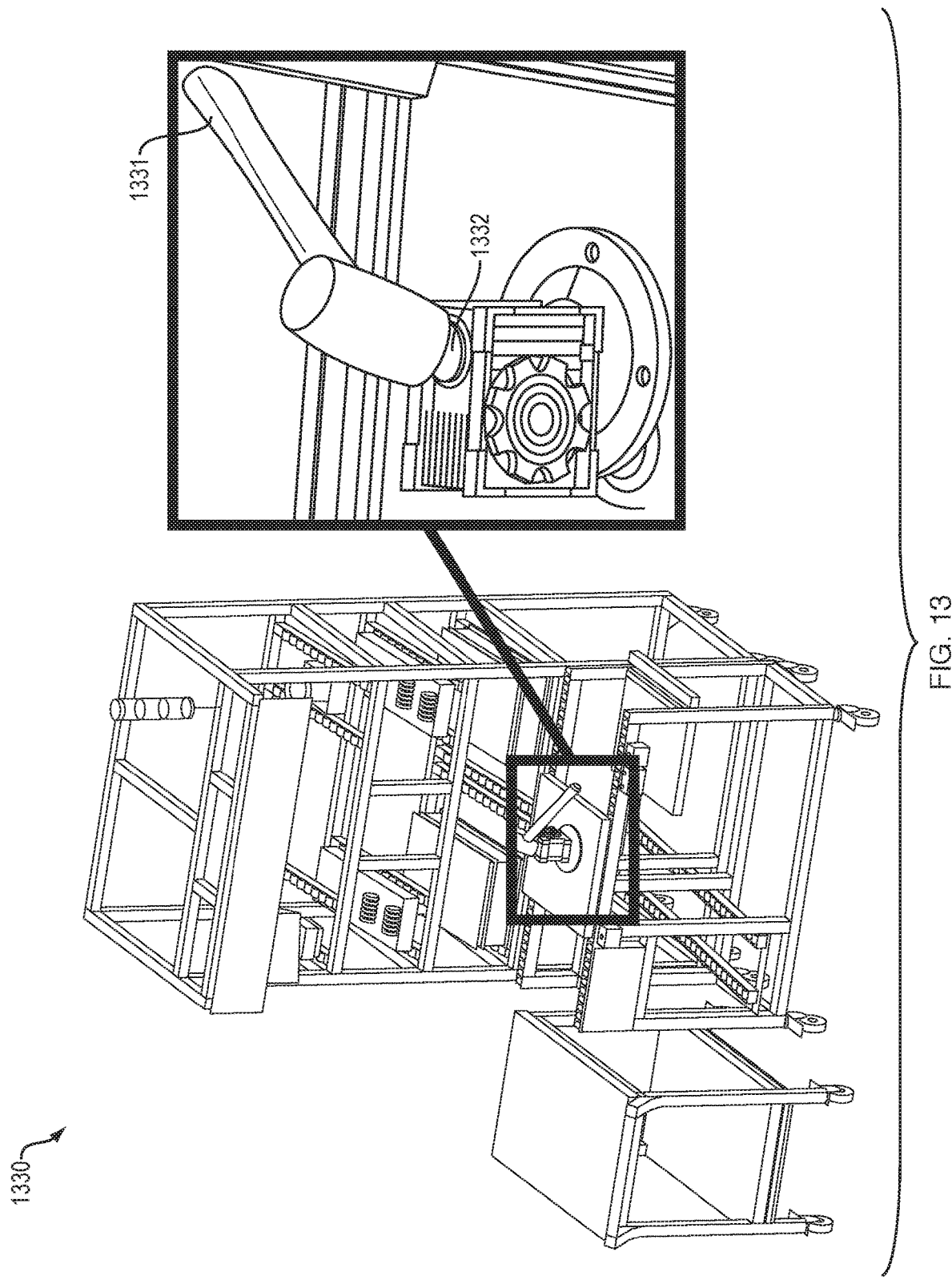
FIG. 13 is an illustration of an environment in which embodiments may be used to determine positioning.

The methods for determining position of a mannequin described above, e.g., the method 100, were tested. Specifically, tests of grasping a hammer were performed when applying different geometrical constraints to the solver. The 3D industrial environment 1330 depicted in FIG. 13 was used for the tests. The task to be performed by the worker was to use a hammer 1331 to hammer down a plastic cap 1332 inside a gearbox hole. For the results discussed below, the optimal hand posture and rotation limitation of the hand on the tool are defined based on visual validation of the tool grasp in a 3D environment. Further details of an optimal hand posture are described hereinbelow in relation to FIGS. 17, 18A, and 18B.

The objectives of the tests were to observe how the hand orientation on the tool moves depending on the geometrical constraints and how the wrist angle deviates from its optimal neutral posture depending on the geometrical constraints that are used.

Figure 14A:
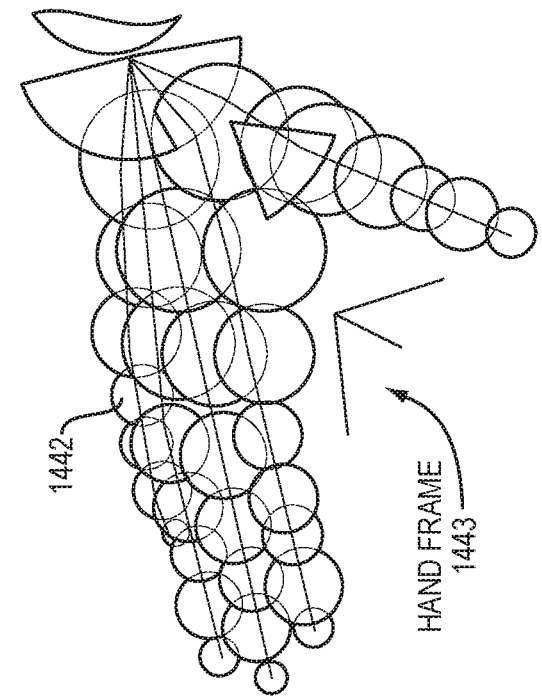
FIG. 14A portrays a tool frame that is used for implementing an embodiment.
Figure 14B:
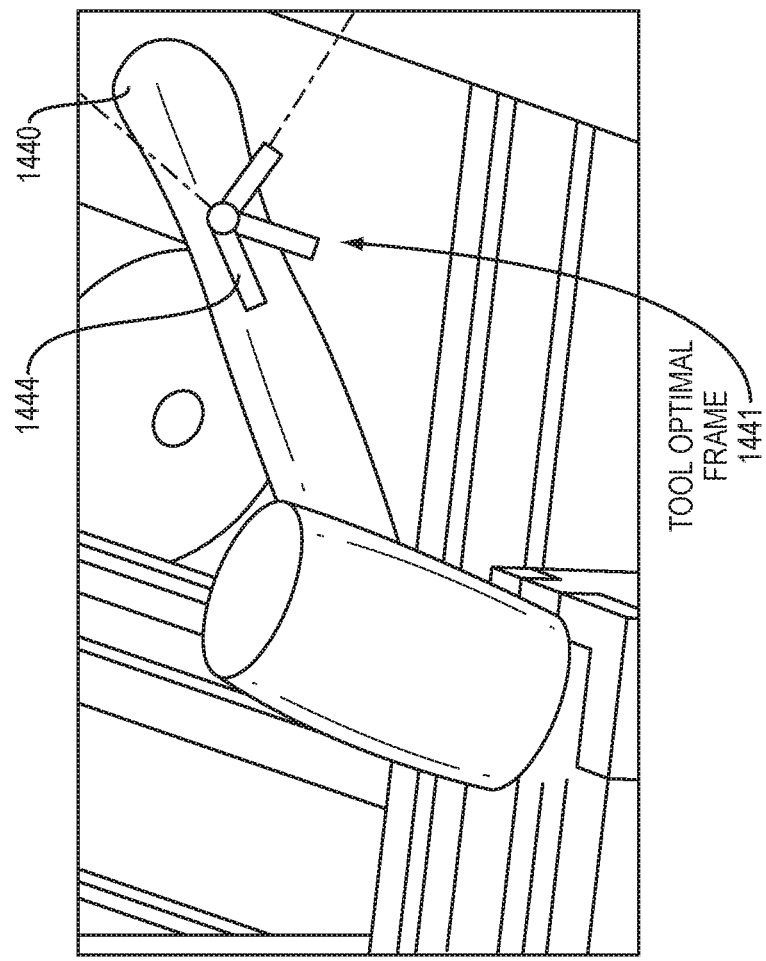
FIG. 14B portrays a model of a hand and an associated frame for an embodiment.

The testing applied geometrical constraints including frame, optimal position, and hinge constraints. For the frame constraint, no degrees of freedom were allowed and, as such, the target frame and hand frame were perfectly coincident. The optimal position constraint required an optimal position and orientation of the hand on the handle. FIG. 14A illustrates the hammer 1440 with the frame 1441 defining the optimal hand position. FIG. 14B illustrates the hand model 1442 used and the hand frame 1443 associated with the hand model 1442. While the optimal position constraint required an optimal position and orientation of the hand on the handle, for the testing, rotation of the hand around the handle (axis 1444, also called Z axis) was allowed (−15°; +60° from the tool optimal frame 1441). For the hinge constraint, the hand 1442 can freely move around the handle, thus allowing more flexibility for the whole body positioning while keeping the optimal position and orientation as an objective.

Figure 15A:
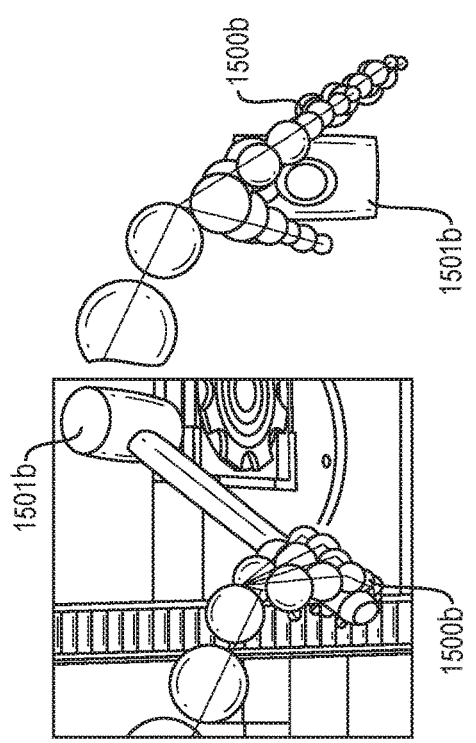
FIGS. 15A-C are graphical representations of hand orientation on a tool determined using embodiments.
Figure 15B:
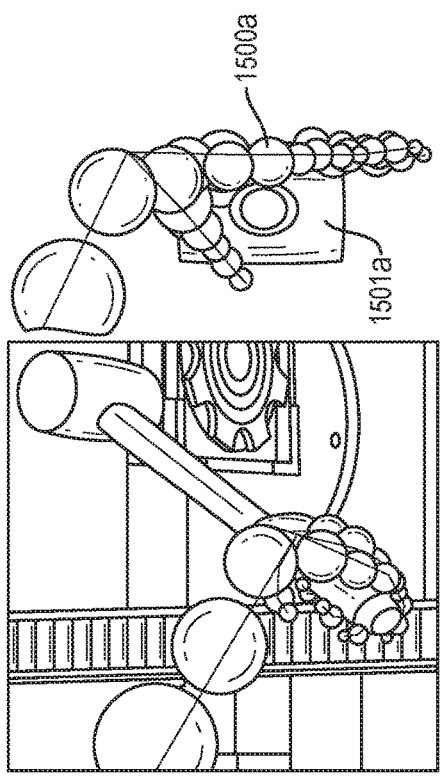
Figure 15C:
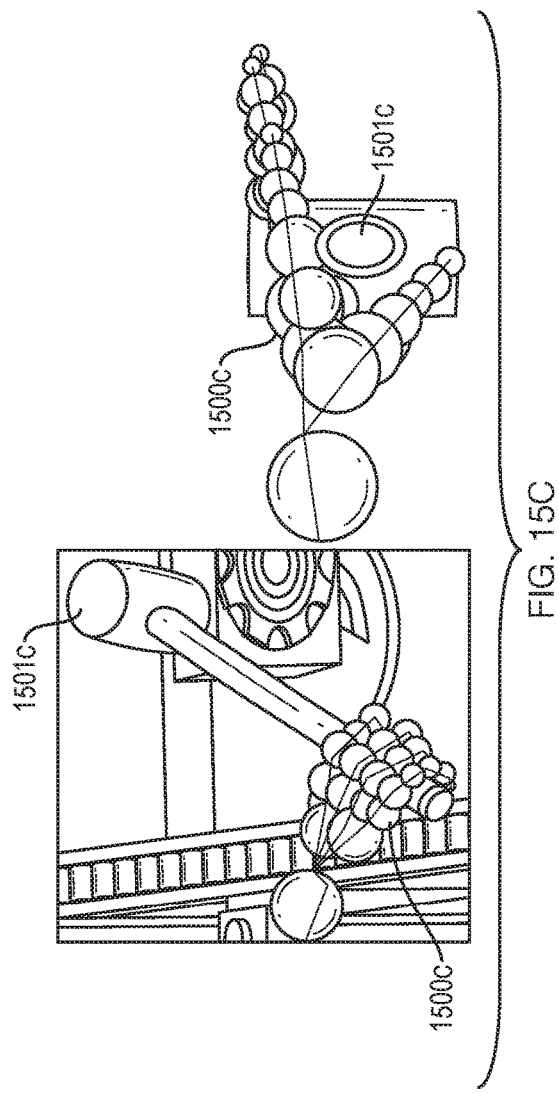

FIGS. 15A-C are graphical representations of hand orientation on a tool determined using the aforementioned constraints. FIG. 15A illustrates position of the hand 1500a on the hammer 1501a when using a frame constraint, i.e., frame target. FIG. 15B illustrates the position of the hand 1500b on the hammer 1501b when using an optimal hand posture constraint with degrees of freedom. FIG. 15C illustrates position of the hand 1500c on the hammer 1501c determined using the hinge constraint with no optimal position/orientation constraint.

Table 1 shows the deviation between the hand frame and the optimal tool frame from the aforementioned testing. The deviation is measured in degree of rotation around the Z axis of both frames (since they are coincident). Wrist composite angle has also been measured. Wrist composite angle is the composite angle of the wrist flexion and ulnar deviation. The higher the composite angle, the further the wrist is from its optimal position i.e., 0°. These values were measured when applying the three different geometrical (frame, optimal hand position, and hinge) constraints to the posture solver.

TABLE 1

Wrist Angle Versus Target Frame Deviation

|  | Frame | Optimal Position | Hinge |
|---|---|---|---|
| Deviation From Target | 0 | 32.1 | 94.2 |
| Composite Angle | 65.0 | 38.3 | 0 |

Embodiments provide a method to determine and formulate grasp inputs to a digital human model posture solver, such as the SPE or other such inverse kinematic solver known in the art, to have a flexible grasp. Embodiments formulate and determine the inputs needed to the posture solver. The embodiments described herein generate a posture when grasping a hammer. The testing compared grasp results in terms of hand orientation on the tool and wrist angle when grasping a tool with different constraint types.

Table 1 shows the wrist angles versus the deviation angle between the hand frame and the tool frame for the three different geometrical constraints applied. The more degrees of freedom allowed to the solver, the smaller the wrist angle. This implies that the more degrees of freedom given to the solver, the more optimal wrist posture is found. However, with more degrees of freedom come more deviations of the hand frame from the target frame. This means that the more degrees of freedom that are allowed, the further the hand is from its optimal hand posture on the tool. FIG. 15C illustrates that when using the hinge constraint, the hand orientation on the tool handle is not optimal to complete the hammering task. It is not guaranteed that the worker would be able to accomplish such a task with this grasp on the tool. On the other hand, the wrist angles are the closest to their optimal posture.

The hinge constraint allows for more whole body posture flexibility to grasp the tool when not using the tool. In this context, the hand can freely rotate around the tool to find the best wrist posture without risking having a wrong hand orientation. The optimal hand position and orientation constraint with degree of freedom limits yielded the best results for positioning when using the tool. The results using the optimal hand position constraint are a good compromise that ensures a plausible grasp and gives some freedom to the solver to find the best wrist posture.

The results show examples of hammer grasping. This grasp strategy can be applied to other tools which are graspable with a medium wrap grasp type [8]. In an embodiment, the optimal hand posture on the tool and the rotations limits can be defined manually in a virtual 3D environment. In another embodiment, the optimal hand posture and degree of freedom limitations can be determined by experimentally measuring real hand position on tools. Embodiments can also extend this grasp strategy to other tool types, such a drills, pliers, brushes, and pistol-style tools.

Embodiments provide a new way of formulating grasping constraints to a digital human model posture solver. Instead of using a frame as a target to reach, degrees of freedom are specified to the solver. These degrees of freedom can also be limited to ensure an appropriate hand position on the tool. In this way, when trying to find the best mannequin positioning, i.e., posture, the solver has more freedom, which results in determining a better final body posture.

The aforementioned testing results focused on the grasping element, e.g., hand, positioning when grasping a tool. However, embodiments of the present invention can also determine whole-body positioning, i.e., global posture, for an object performing grasping, such as a human.

Embodiments for determining whole-body positioning can be implemented in conjunction with, or as a component of, a digital human model posture engine, i.e., an inverse kinematic solver, such as the SPE developed by the Applicant or other such inverse kinematic solvers. As such, the models and methods described below may be part of a digital human model posture engine. This posture engine can be used to predict a posture in an autonomous manner in order to simulate use of a tool in an environment and analyze the risk of MSD for various tasks in a virtual workplace. In an embodiment, the risk of MSD is estimated by analysing the deviation from neutral of specific joints (e.g. wrist, shoulder, spine).

Described below is an example implementation of an embodiment that determines full body posture. Further, the description below outlines one such example implementation, the models used in the implementation, and the results thereof. However, it is noted that embodiments of the present invention are in no way limited to the particular models described herein and embodiments may use any such human or object computer-based model known in the art. The below description is but one example implementation of embodiments of the present invention that determine positioning of an object when grasping.

Figure 16:
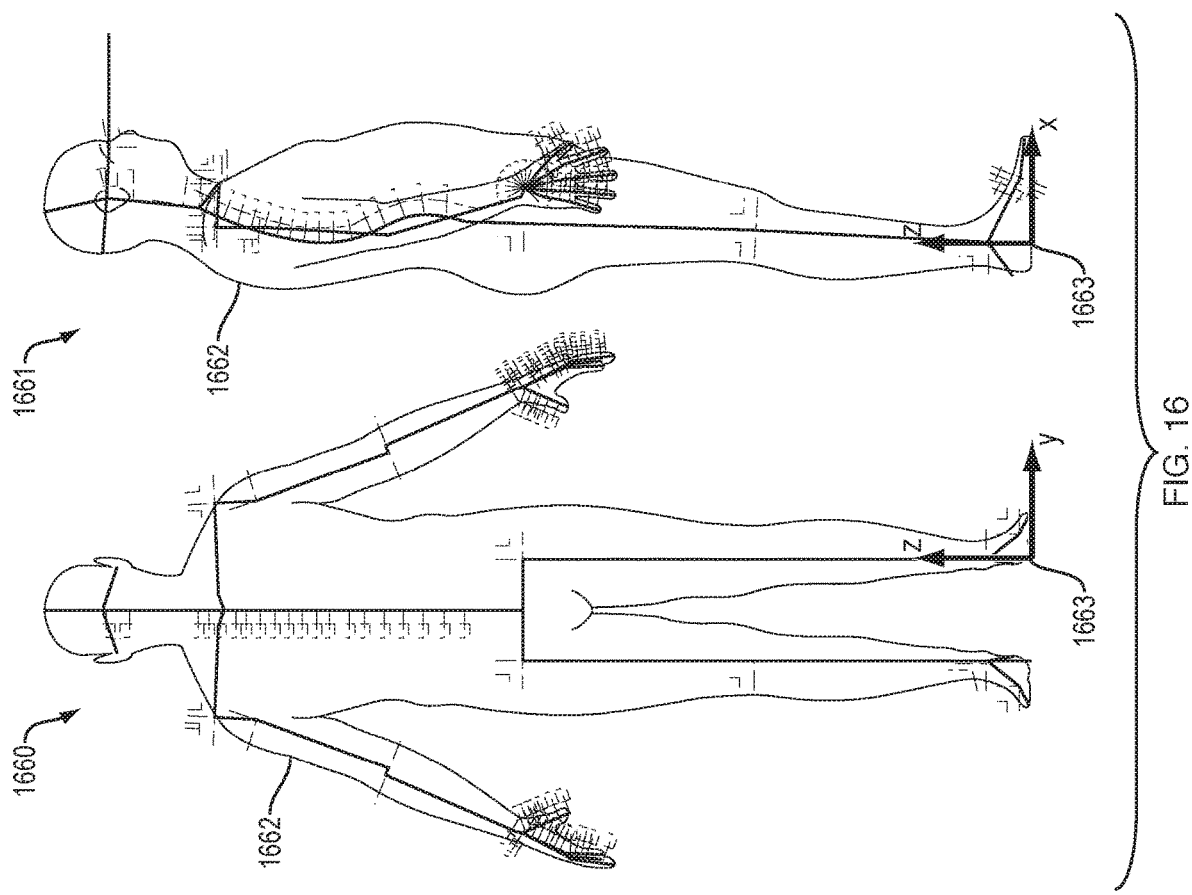
FIG. 16 portrays a digital human model for which positioning may be determined using an embodiment.

An example embodiment utilizes a digital human model from a single average anthropometry. This digital human model includes a $50^{th}$ U.S. male citizen (stature=176.2 cm, BMI=27, and sitting height/stature ratio=0.523, age=40). FIG. 16 illustrates a front view 1660 and side view 1661 of the example digital human model 1662. The model 1662 is based on the statistical body shape model of Parkinson and Reed [19] and Reed, et al. [22]. The estimation of the internal joint locations is determined using regression equations based on external bony landmarks [21]. The external bony landmarks and internal joint locations can be downloaded from the database (humanshape.org) and imported into Matlab software (The MathWorks, USA). All the relevant mechanical joints of the body model 1662 can be created using digital human modeling techniques [4-7, 10 14, 20]. The model 1662 includes 147 degrees of freedom. Further, the model 1662 has 29 spherical joints: 2 hips, a spine (5 lumbar and 12 thoracic), 2 sternoclavicular, 2 acromioclavicular, 2 glenohumeral, 1 neck, 1 head, and 2 thumb carpometacarpal (CMC). The model 1662 has 15 universal joints: 2 wrist, 2 ankle, 2 knee, 1 monocular visual line-of-sight, and 8 metacarpophalangeal (MP) (index to auricular). Moreover, the model 1662 has 30 hinge joints: 2 elbow flexion, 2 elbow pronation, 20 inter-phalangeal (IP), 4 CMC (annular and auricular), and 2 toe flexion. In this example embodiment, the flexion of the annular and auricular CMC joints is allowed to integrate palmar arch functionality [20]. The coordinate systems and degrees of freedom of these joints are created from the external landmarks using the standards of the International Society of Biomechanics (ISB) [25, 26].

However, embodiments can employ exceptions to the traditional standards. For example, an exception to the arm can be used which defines the arm as flexion, abduction, and internal rotation to avoid gimbal lock at a rest posture.

Another exception that can be implemented in embodiments applies to the elbow pronation axis, which can be estimated from the mean functional helical axis measured by Tay, et al. [24]. In such an embodiment, based on an interpretation of that mean axis, the proximal end of the elbow pronation axis is placed midway between the elbow center of rotation and the lateral epicondyle. The distal end of the elbow pronation axis is placed midway between the ulnar styloid and the wrist joint.

Embodiments employ an inverse kinematic solver. In one such embodiment, the inverse kinematic solver is based on the pseudo-inverse of the Jacobian [14] equipped with a selective filter [15]. The solver uses different strict priority levels to rank, i.e., weight, the kinematics constraints imposed on the digital human model by their level of importance (e.g., 1. foot positioning, 2. equilibrium, 3. hand reach, 4. gaze). According to an embodiment, on the top of the constraint layer, the inverse kinematic solver attempts to minimize joint deviation from a predefined neutral posture [14]. For a redundant digital human model, such optimization helps to converge to a posture with minimal degree of freedom deviation from neutral. The determined posture in such an implementation is more ergonomically acceptable, since it is less likely to trigger a MSD flag during any subsequent ergonomic analysis, which is also based on the deviation of specific joints.

In an embodiment, the degrees of freedom of the digital human model kinematic root and the degrees of freedom of the right upper extremity (clavicle to wrist) are activated, i.e., considered by the solver. However, in an embodiment, the degrees of freedom of the spine and lower limbs of the model are not activated. The root degrees of freedom allow for a global mobility of the model without having to move the spine and lower extremities. This strategy gives more room to minimize joint deviation from neutral without leading to awkward spine and lower body postures. In an embodiment, the root segment 1663 depicted in FIG. 16 is located at the left foot and is allowed to translate along the floor XY plane (degrees of freedom 1 and 2) and rotate around the floor Z plane normal (degree of freedom 3). The degrees of freedom of the sternoclavicular and acromioclavicular joints are rigidly coupled to the flexion and abduction of the glenohumeral joint (i.e., arm) using linear equality couplings. In an embodiment, these couplings are estimated using the method proposed in Lemieux, et al. [18] for a complete clavicle-scapula-humerus (CSH) model. These couplings are enforced on the highest priority level (i.e., level 0). Due to these couplings, the clavicle and scapula degrees of freedom are not part of the active degrees of freedom. The reach constraint on the right hand is set at priority level 1. The root 1663 at the left foot is free to translate ±1 m and rotate ±360° from its initial pose in front of the tool. Table 2 shows the active degrees of freedom and their neutral values ($q_N$).

TABLE 2

Optimization Weights, Neutral Values and Limits of the Active Degrees of Freedom of the Upper Extremity

| Joints | Degrees of Freedom | Weight | Neutral Value | Limits Lower | Limits Upper |
|---|---|---|---|---|---|
| Arm | Flexion | 0.3 | −21 | −83 | 108 |
|  | Abduction | 0.3 | 3.2 | −88 | 61 |
|  | Internal rotation | 0 | — | −99 | 208 |
| Elbow | Flexion | 0 | — | 0 | 150 |

TABLE 2-continued

Optimization Weights, Neutral Values and Limits of the Active Degrees of Freedom of the Upper Extremity

| Joints | Degrees of Freedom | Weight | Neutral Value | Limits Lower | Limits Upper |
|---|---|---|---|---|---|
|  | Pronation | 0 | — | −91 | 82 |
| Wrist | Flexion | 0.1 | 0 | −90 | 82 |
|  | Deviation (ulnar) | 0.1 | 0 | −52 | 32 |

The values in Table 2 represent a rest posture with the arms alongside the body. The neutral values of the glenohumeral flexion and abduction were not null, since they are computed relative to a non-vertical scapula at rest. These neutral values can be used to optimize the posture (defined by the vector of degrees of freedom (q), using the objective function represented by equation 1:

$$h(q) = w*(q-q_N)^2 \quad \text{Equation 1}$$

For the embodiment for which the data is shown in the Table 2, the weight (w) is in the range [0, 1]. The degrees of freedom selected for the example optimization are those with a positive weight presented in Table 2. Arm flexion and abduction have higher weights in the embodiment in an attempt to keep the hand close to the body. This strategy is more likely to lead to ergonomically acceptable postures. The humerus internal/external rotation limits are coupled to the humerus flexion and abduction [18]. The limits of this rotation (Table 2) represent the lowest and highest values using that coupling. The second degree of freedom (internal rotation) of the spherical thumb CMC joint are rigidly coupled with the first and third degrees of freedom (i.e. flexion and abduction), using the rotation sequence and data of Cheze, et al. [16]. It is noted that in embodiments, the weights may be set based upon user input, as there is no clear consensus of the best weights to use in the literature.

Objective

The objective of an embodiment is to grasp the tool in an autonomous manner, while allowing additional hand mobility with respect to the tool geometrical features and intended task. The tool used for the example implementation described below is a copper mallet with a wooden handle (bounding box of 7.5×3.3×27.5 cm). This mallet was the heaviest (1.96 kg) from a set of mallets (0.34 to 1.96 kg) obtained from Marketplace PartSupply (see partsupply.3dexperience.3ds.com). In an embodiment, the model of tool is wrapped to generate a single uniform external shape, such as the tool 1771 in the environment 1770 depicted in FIG. 17. Given the mallet size (midsize handle diameter of 4.2 cm) and weight, the embodiment utilizes an enveloping grasp on the handle of the tool 1771.

Figure 17:
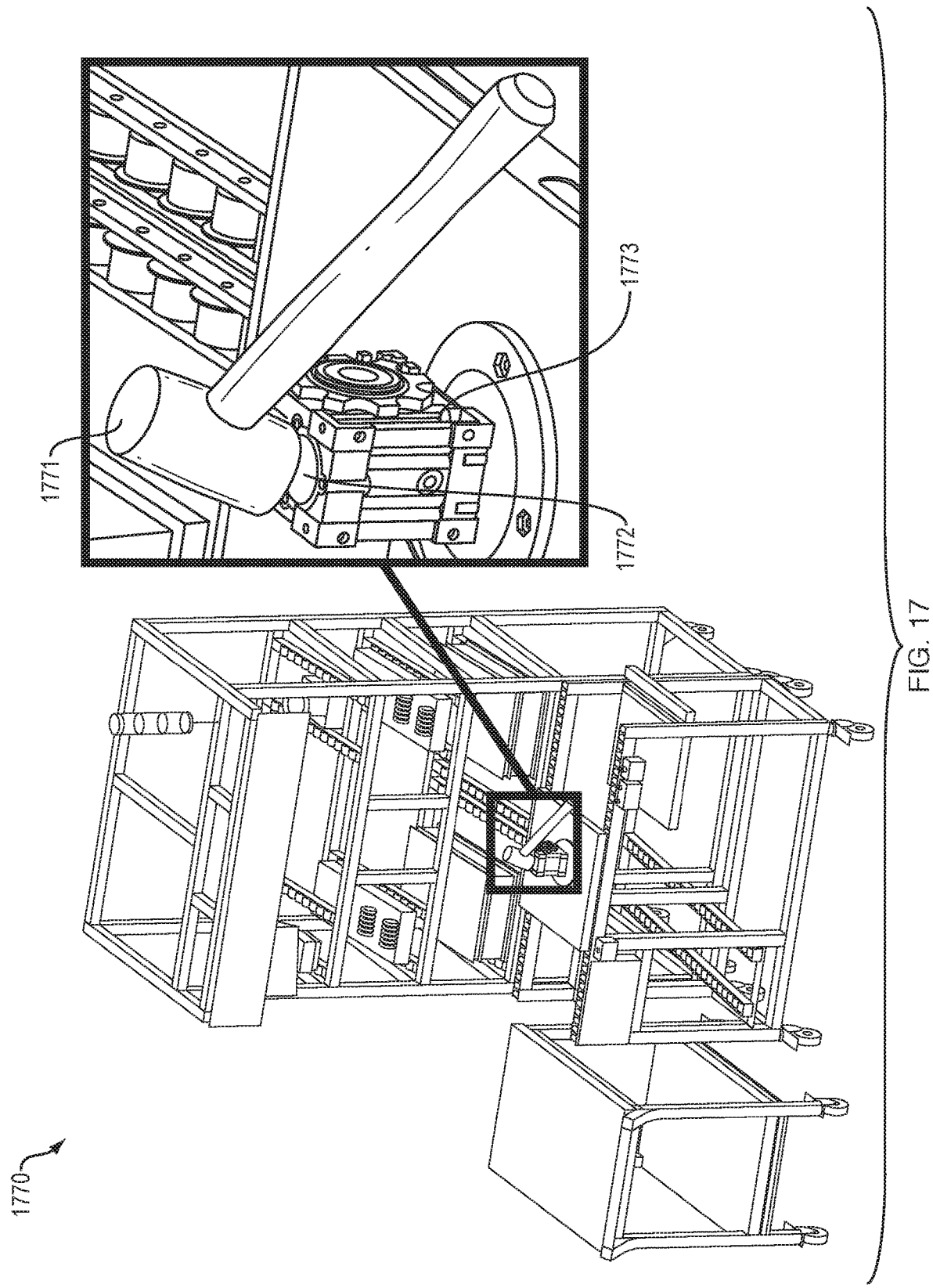
FIG. 17 is an illustration of an environment in which embodiments may be used to determine positioning.
Figure 18B:
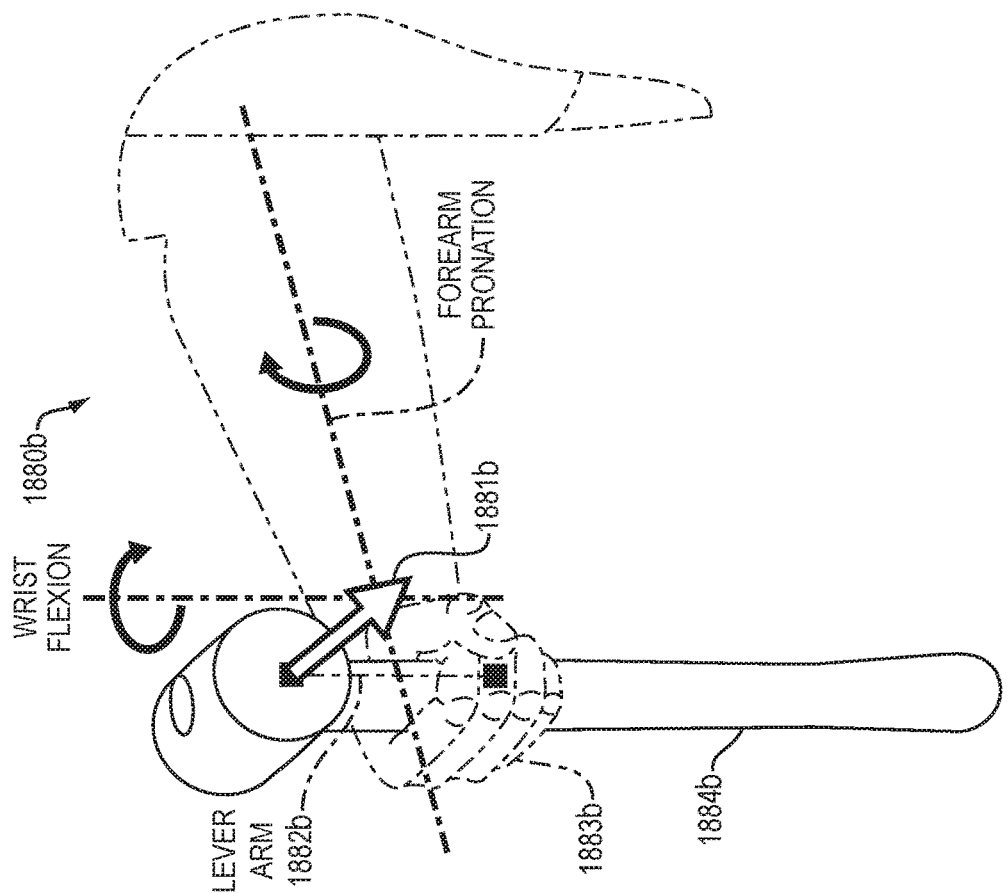
FIG. 18A and FIG. 18B depict grasps that may be employed in embodiments to determine whole-body posture.
Figure 18A:
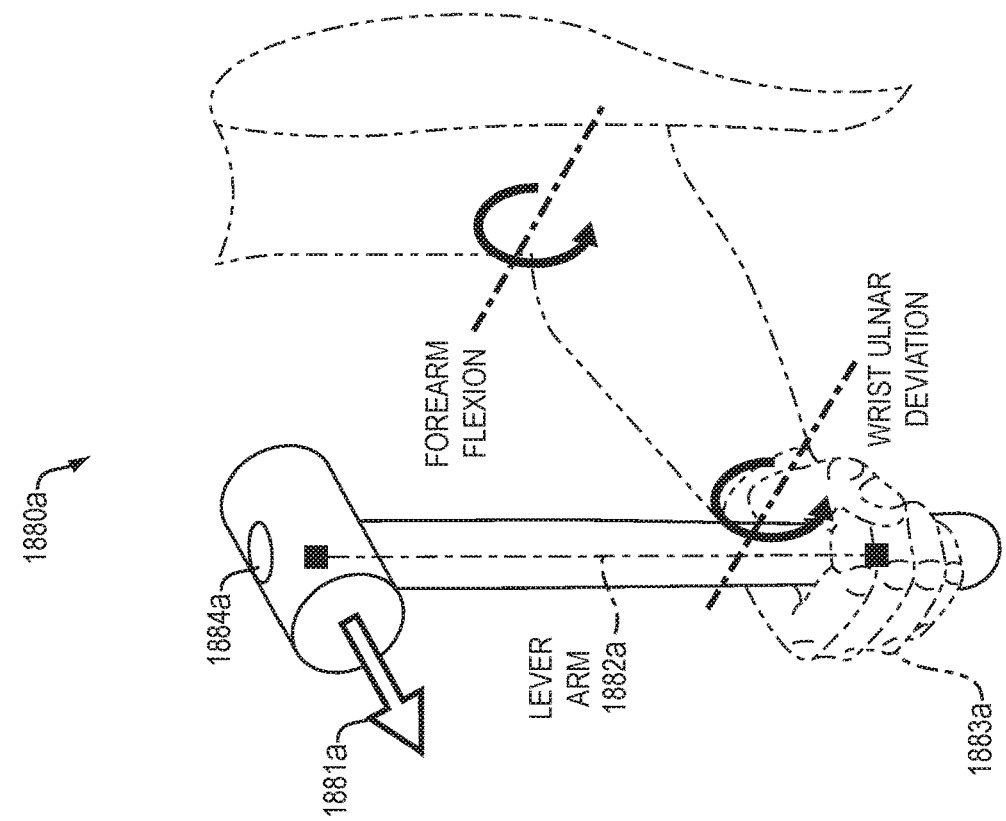

The simulated task in the example implementation described below and depicted in FIG. 17 is hammering the plastic cap 1772 inside a gearbox 1773 hole. FIG. 18A and FIG. 18B depict grasps 1880a and 1880b that may be employed in embodiments to determine whole-body posture. In this example embodiment it can be assumed that the task requires giving some velocity to the mallet 1884a-b head to generate a sufficient hitting force at its working tip 1881a-b. This force can be more easily generated by grasping the mallet 1884a at the bottom of the handle, thus providing the largest mechanical lever arm 1882a possible compared to the lever arm 1882b for the grasp 1880b. Moreover, the reference hand 1883a orientation shown in FIG. 18A is set so that the hammering motion is generated from wrist ulnar deviation and forearm flexion when the mallet 1884*a* is held in front of the body. In contrast, the grasp 1880*b* shown in FIG. 18B is suboptimal because the hand 1883*b* is close to the working end and the mallet 1884*b* is oriented in a way that the hammering motion is generated by wrist flexion and forearm pronation, which are less indicated for forceful actions.

Tool Reference Frame

According to an embodiment, the tool reference frame is created by first extracting geometrical features on the tool (e.g. key points and guiding vectors). In an embodiment, the geometrical features, i.e., affordance cues of the object being grasped, may be automatically determined as described in provisional application 62/842,337, filed on May 2, 2019 and non-provisional application Ser. No. 16/864,484 "Extracting Grasping Cues From Tool Geometry For Digital Human Models" by Alexandre Macloud, Louis Rivest, Ali Zeighami, Pierre-Olivier Lemieux, Rachid Aissaoui. These features allow the different functional parts of the tool (e.g. handle, head) to be exploited when determining grasp. In an embodiment, the features are automatically extracted via an analysis of the cross-section areas of the tool in the direction of its principal axes of inertia. This functionality may be performed as described in U.S. Provisional Application No. 62/842,337, filed on May 2, 2019, and/or non-provisional application Ser. NO. 16/864,484 "Extracting Grasping Cues From Tool Geometry For Digital Human Models" by Alexandre Macloud, Louis Rivest, Ali Zeighami, Pierre-Olivier Lemieux, Rachid Aissaoui.

Figure 19:
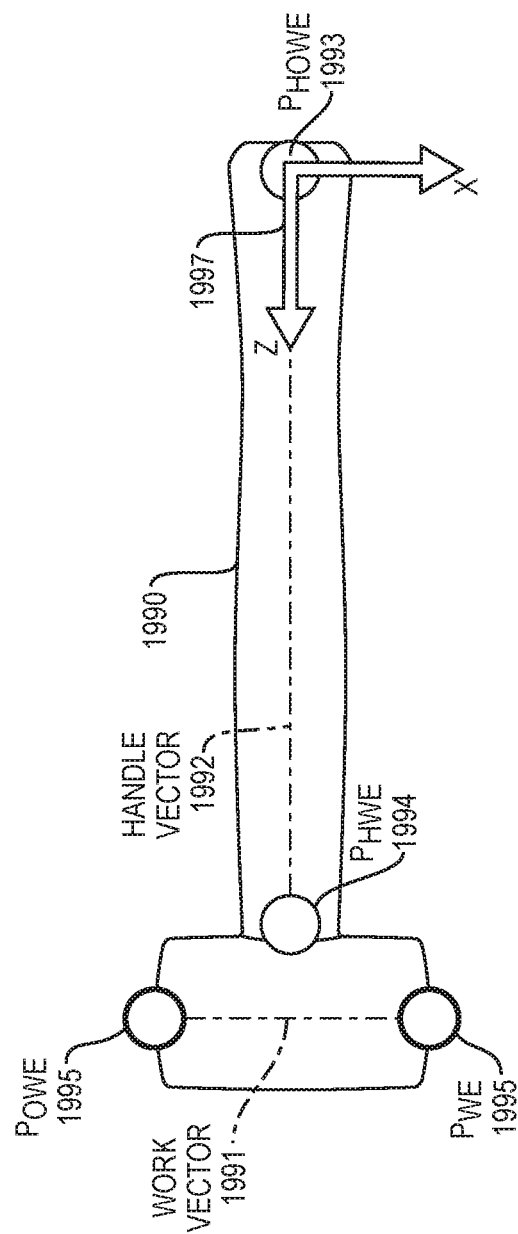
FIG. 19 portrays geometrical features of a tool used to create a reference frame in an embodiment.

FIG. 19 illustrates the results of feature extraction for the mallet 1990. For the mallet 1990 two guiding vectors 1991 and 1992 were determined using the geometrical features of the mallet 1990. The handle vector 1992 is defined from the point on the handle opposed to the work end (PHOWE) 1993 to the point on the handle closest to the work end (PHWE) 1994. The work vector 1991 is defined between the point opposed to the work end (PowE) 1995 and the point representing the work end (PwE) 1996. The origin of the tool reference frame 1997 coincides with the handle point opposed to the work end (PHowE) 1993. The z-axis of the reference frame 1997 is parallel to the handle vector 1992. The y-axis of the reference frame 1997 is parallel to the vector resulting from the cross product between the work vector 1991 and the handle vector 1992. The x-axis for the reference frame 1997 is determined from the cross product of the previously defined y-axis and z-axis.

Hand Positioning Mobility

To allow a flexible hand pose, in an embodiment, the end-effector is equipped with a static offset and 3 additional degrees of freedom. When reaching the tool with the right hand, the static offset prevents large collisions during the grasping, such as the grasping depicted in FIGS. 5A-B, between the hand and the tool without having to avoid the collisions. According to an embodiment, during operation, the offset is determined by accessing a database of pre-defined offsets that were determined by manually grasping cylinders with radii approximating the radii of tools in order to obtain a visually plausible grasp with a contact between all the fingers and the cylinder.

Figure 20B:
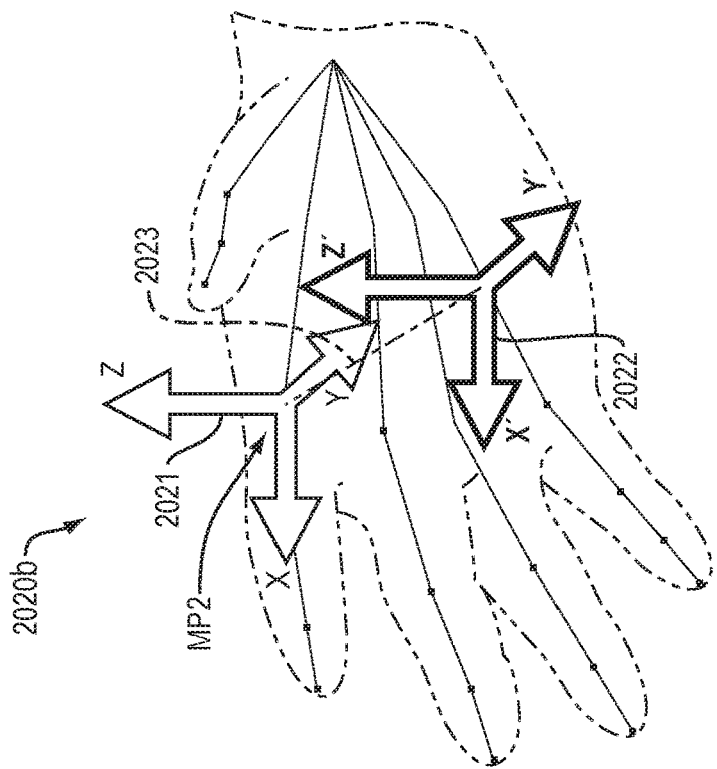
FIGS. 20A and 20B are views of frames and the positions of the frames determined in embodiments.
Figure 20A:
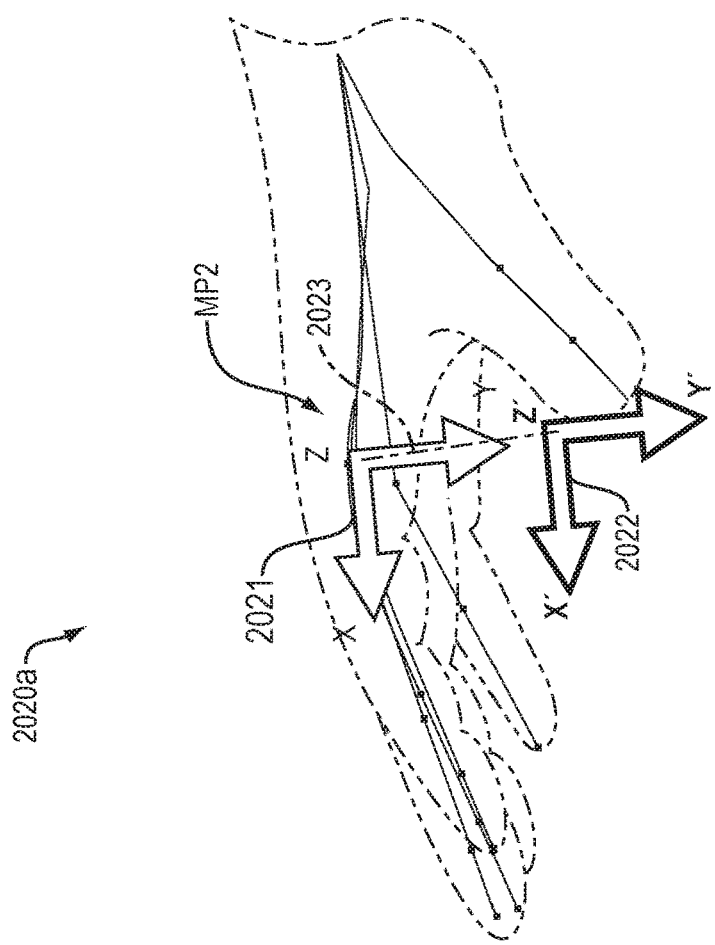
Figure 21:
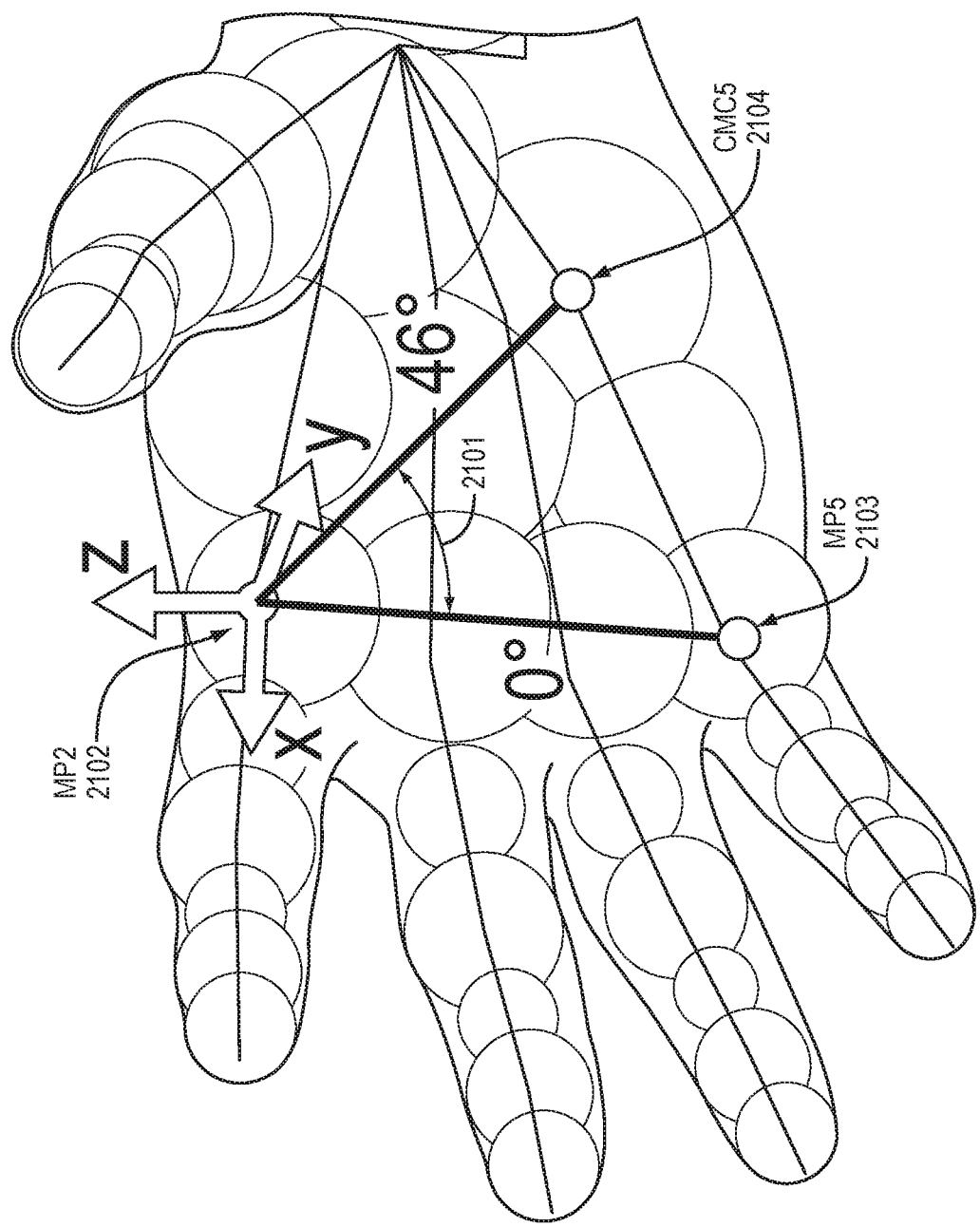
FIG. 21 illustrates a degree of freedom limitation in an example embodiment.

FIG. 20A is a top view 2020*a* and FIG. 20B is an isometric view 2020*b* illustrating frames 2021 and 2022 and the positions of the frames 2021 and 2022 determined in an embodiment. FIGS. 20A and 20B illustrate a resulting offset 2023 defined with respect to an intermediate reference frame 2021 located at the second metacarpophalangeal joint (MP2). For the mallet example embodiment, the offset in the X-direction is set to 3 mm. The offset in the +Y direction corresponds to the summation of the radius of the handle best-fit cylinder (i.e. 21 mm) and the radius of the MP2 contact sphere (i.e. 14 mm). The first additional degree of freedom for the tool is a rotation about the y-axis of the intermediate reference fame 2021. This degree of freedom allows the hand to rotate about its dorsal-palmar axis (i.e. plane of hand palm). Two other additional degrees of freedom that may be employed in embodiments are a translation and a rotation about the z'-axis of the hand, i.e., about the z' axis of the frame 2022, allowing the hand to translate and rotate about the handle axis which is coincident with Z'-axis of the reference frame 2022.

Degree of Freedom Limitations

Using the aforementioned degrees of freedom (rotation about the plane of the palm of the hand, rotation about the handle axis, and translation about the handle axis) the hand can have a flexible position and orientation with respect to the tool reference frame. However, that extra mobility can be limited in embodiments to ensure the plausibility of the grasp with respect to the tool and the intended action. For instance, in one such example embodiment, the rotation with respect to the y-axis of the intermediate reference frame (i.e., hand palm plane) is limited to be between 0 and 46°. This limit 2101 is depicted in FIG. 21. In such an example embodiment, the lower bound allows the cylinder approximating the tool handle to touch the MP2 2102 and MP5 2103 joints. The upper bound of the limit 2101 allows the cylinder to touch the MP2 2102 and the fifth carpometacarpal (CMC5) joint 2104. Grasping the tool in that range ensures a proper contact between the handle and the palm of the hand.

Figure 22B:
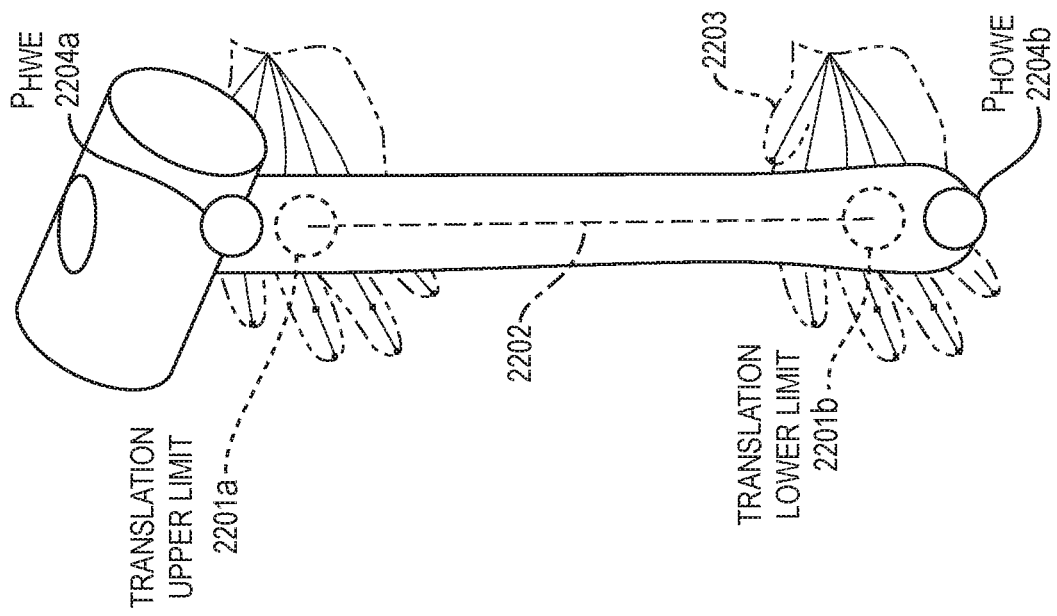
FIGS. 22A and 22B illustrates degree of freedom limitations that may be employed in embodiments.
Figure 22A:
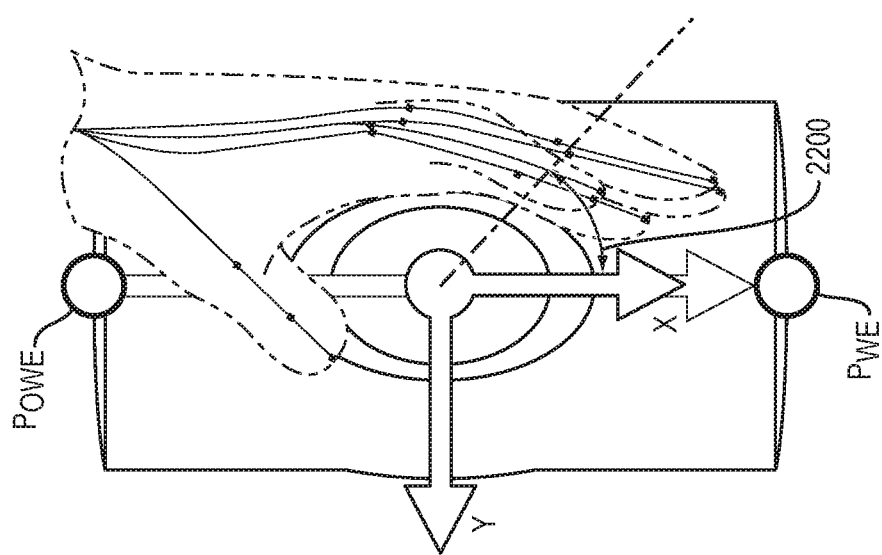

FIGS. 22A and 22B illustrate additional degree of freedom limitations that may be employed in embodiments. FIG. 22A illustrates a rotation limit 2200 that limits the rotation about the handle axis to be between 0 to 60°. When grasping with the right hand, a positive rotation about the handle creates a pronating grasp. Such grasp is more likely to resist to the upward reaction force provided by the hammering task. FIG. 22B illustrates a translation limit (composed of the limits 2201*a* and 2201*b*) that limits the translation of the hand 2203 on the handle axis 2202 so that the hand 2203 does not go beyond the handle lower limit 2204*b* and the handle upper limit 2204*a*. To provide these limits, the additional translation limit points 2201*a* and 2201*b* are specified on the handle axis 2202. These limit points 2201*a-b* represent the upper and lower limits of the hand frame along the handle axis 2202, so that all the fingers envelop the handle to realize the final grasp. In such an embodiment, the final translational range of motion is equal to the distance between the two handle points 2204*a-b* further removing half of the hand width at each extremity (i.e. 20.7 cm), thus giving the adjusted handle points 2201*a-b*. In an embodiment, the reference hand position is located at the lower hand limit 2201*b* shown in FIG. 22B. Meanwhile, in an embodiment the reference hand orientation is set to be the same as the tool reference frame.

Constraint Types

Embodiments for determining whole body positioning may employ a variety of different constraints. As such, the constraints that are used may be based upon user input indicating the constraints to employ.

Embodiments can employ a frame constraint. The frame constraint enforces the exact reference hand pose and does not involve any additional degrees of freedom. The exact reference hand pose can be pre-determined and stored in the computer program. Embodiments may also implement a hinge constraint that allows an unlimited rotation around the handle axis. Further, embodiments can utilize a cylindrical constraint that allows a rotation about the handle axis and a translation along that same axis. The cylindrical constraint can use limits that can be defined based upon user input. The limits can also be pre-determined by trials and errors and stored in the computer program or a database. Moreover, embodiments can employ a "flexible" cylindrical constraint that allows a rotation and a translation about the handle z-axis, in addition to a rotation about the y-axis of the intermediate reference frame (e.g., hand palm rotation about the y axis of the reference frame 2021). The additional degrees of freedom constraints, e.g., the frame, hinge, cylindrical, and flexible cylindrical constraints, can be implemented by adding the constraints to an objective function that governs the inverse kinematic solver in determining positioning. Defining the objective function in such a way allows embodiments to determine a solution for pose that minimizes deviation of (i) the rotation about the handle z-axis, (ii) translation about the handle z-axis, and (iii) rotation about the y-axis of the intermediate reference frame, from the reference hand pose. In testing embodiments, as described below, the neutral values of these degrees of freedom were set to zero and the objective weights of these degrees of freedom were the same as that of the wrist joint.

Measure of Joint Deviation from Neutral

In embodiments, the influence of the different types of hand-tool constraints on the hand pose and the whole digital human model posture is quantified using a measure of joint deviation from a neutral/reference posture. Regarding hand pose, the translation and rotation between the final end-effector pose and the reference hand pose on the tool is computed for each type of hand-tool constraint. For the cylindrical and flexible constraints, these values correspond to the additional degrees of freedom. Regarding the digital human model posture, the deviation of the spherical glenohumeral joint is measured by expressing its flexion-abduction-axial rotation sequence into swing and twist components [14]. The swing component is measured as the angle change of the longitudinal axis of the humerus between its initial (i.e., vertical) and final orientation. The swing component of the wrist is computed the same way using its longitudinal axis (i.e., vector from the wrist to the MP3 joints). The final hand-pelvis distance is also measured. A high hand-pelvis distance makes the digital human model posture less acceptable from an ergonomic point of view.

Hand Closure

Once the hand-tool pose is estimated, embodiments can determine hand closure. In an embodiment, the closure is determined using a piecewise linear interpolation between open and closed configurations. The open configuration corresponds to a flat hand with the thumb in full abduction. The closed configuration corresponds to the closed fist. The enveloping action is simulated by closing the joints sequentially from the most proximal ones (i.e., CMC) to the most distal ones (i.e. distal phalanges). At each of the interpolated configurations, e.g., at each of 20 interpolated configurations, a potential collision between the contact spheres fixed on each phalanx (such as the spheres depicted in FIG. 21) and the tool geometry is checked. The movement of a phalanx is stopped as soon as one of the contact spheres located on the phalanx or on one of its children collides with the tool. A penetration, e.g., 1 mm, of the contact spheres in the tool can be allowed.

Results

Results from testing embodiments that determine whole-body position of a mannequin are described below. The final joint deviations from neutral, hand-tool deviations from the reference hand pose, and the hand-pelvis distances (in cm) are presented in Table 3. All of the constraints yielded results with a null deviation of the translation along the handle. This parameter is thus not shown in Table 3. The frame constraint predicted null hand-tool deviations, but created the highest joint deviations and hand-pelvis distance. The hinge constraint allowed a large hand rotation around the handle axis, which decreased joint deviations, but not the hand-pelvis distance. The cylindrical constraint and its limited hand rotation around the handle axis reduced joint deviation and hand-pelvis distance with respect to the frame constraint. The flexible cylindrical constraint and its additional hand palm rotation predicted no rotation around the handle axis and lead to the second lowest arm and wrist joint deviations and the lowest hand-pelvis distance.

TABLE 3

Final Joint and Hand-Tool Deviations for the Four Types of Hand-Tool Constraints

| | Frame | Hinge | Cylindrical | Flexible Cylindrical |
|---|---|---|---|---|
| Arm joint | 49 | 0 | 5 | 2 |
| Wrist joint | 73 | 0 | 51 | 24 |
| Hand palm rot. | | | | 34 |
| Handle axis rot. | | 98 | 52 | 0 |
| Hand-pelvis dist. | 49 | 49 | 43 | 40 |

Figure 23:
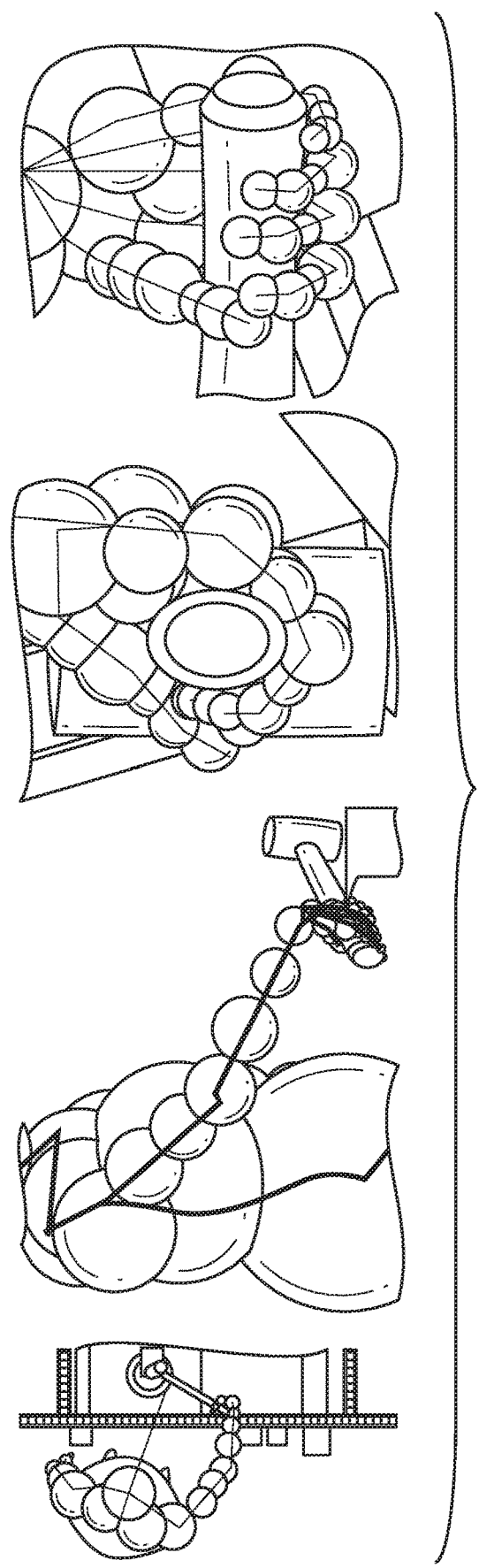
FIG. 23 illustrates positioning for a mannequin determined using a frame constraint in an embodiment.
Figure 24:
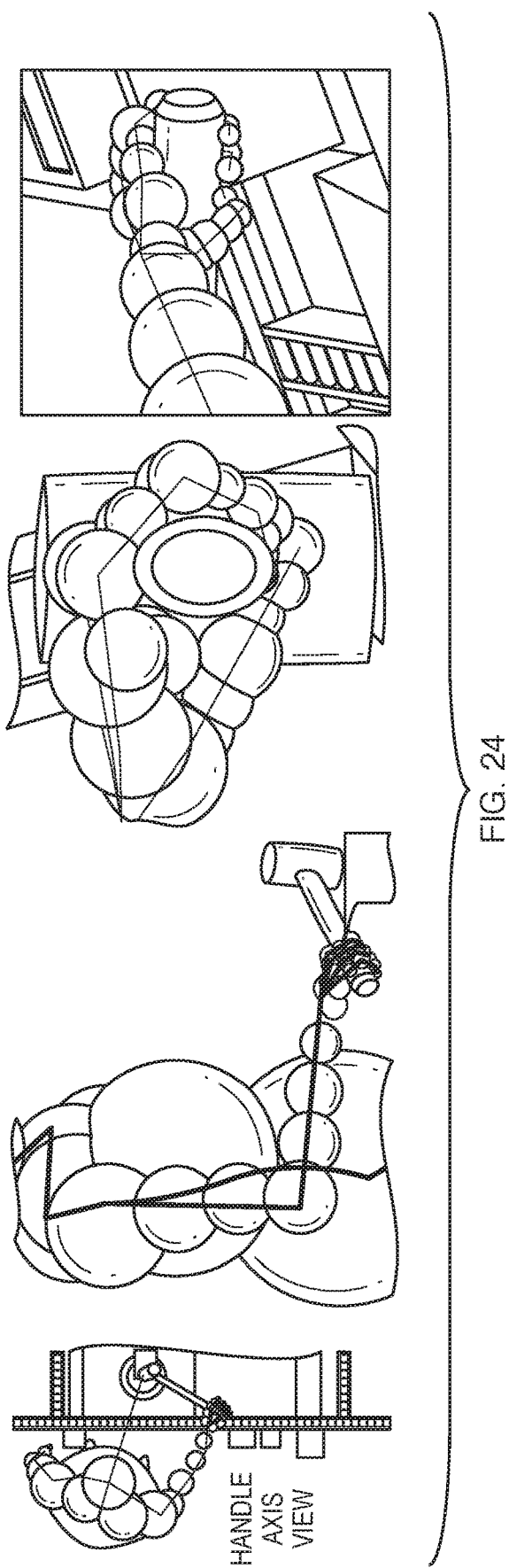
FIG. 24 illustrates positioning for a mannequin determined using a hinge constraint in an embodiment.
Figure 25:
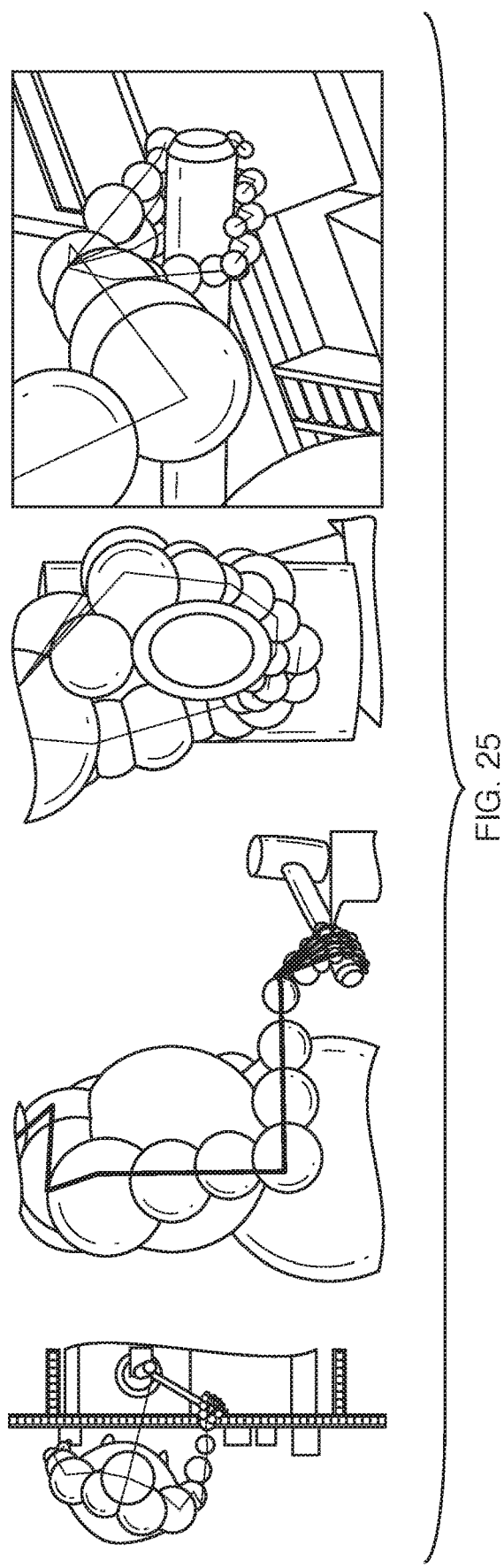
FIG. 25 illustrates positioning for a mannequin determined using a cylindrical constraint in an embodiment.
Figure 26:
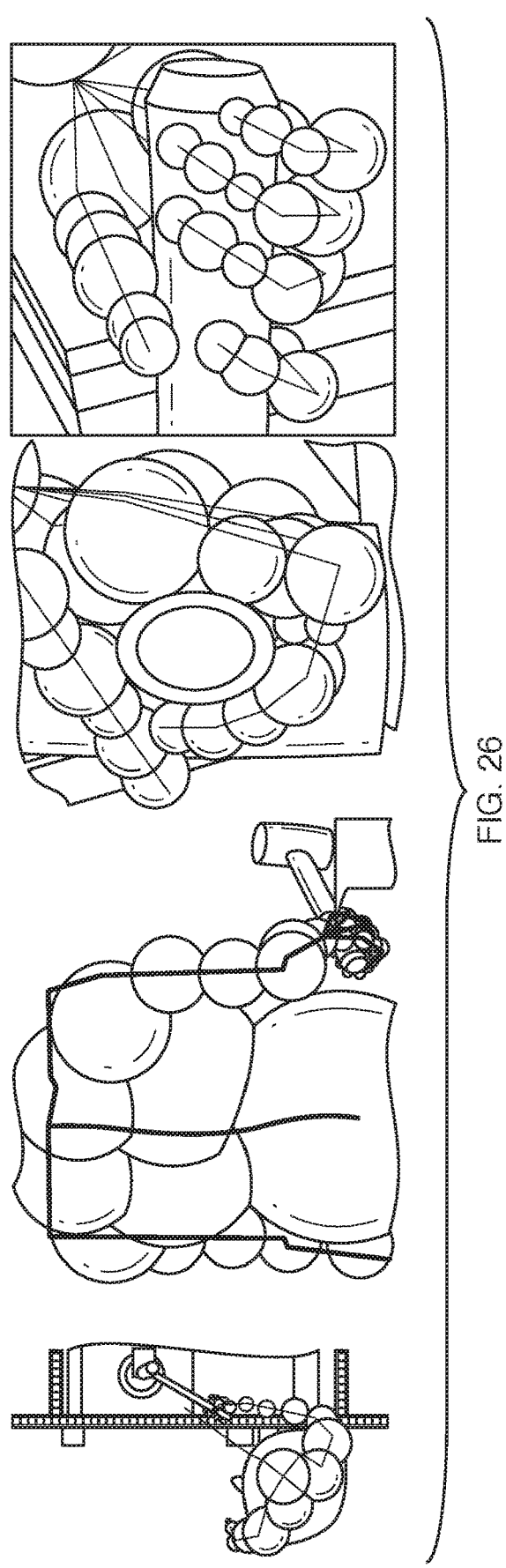
FIG. 26 illustrates positioning for a mannequin determined using a flexible cylindrical constraint in an embodiment.

The final digital human model postures and grasps determined using the frame, hinge, cylindrical, and flexible cylindrical constraints are shown in FIGS. 23-26, respectively. FIG. 23 illustrates the posture and grasp determined using the frame constraint. FIG. 24 illustrates the posture and grasp determined using the hinge constraint. FIG. 25 illustrates the posture and grasp determined using the cylindrical constraint. FIG. 26 illustrates the posture and grasp determined using the flexible cylindrical constraint.

Embodiments provide an approach for determining digital human model tool grasping that simultaneously optimizes hand-tool pose and whole-body posture. This simultaneous optimization is possible through use of a hand-tool flexible cylindrical constraint, which allows the hand to translate along the tool handle axis and to rotate in two directions with respect to the tool handle. The translation and rotations can be limited inside predefined bounds. The effectiveness of this constraint is shown by comparing the postures and grasps determined using the flexible cylindrical constraints to postures and grasps determined using the frame, hinge, and cylindrical constraints.

The positioning determined using the frame constraint reached the reference "optimal" hand pose without any deviation, but lead to the highest arm and wrist deviations. This result shows that a frame constraint leaves only little room for optimizing the whole digital human model posture.

The results determined using the hinge constraint offered more hand pose flexibility than the frame constraint. In fact, the additional unconstrained hand rotation around the handle z-axis for the hinge constraint allowed removing arm and wrist deviations. Thus, making the resulting digital human model posture less at risk for musculoskeletal disorders. However, the hand rotation around the handle z-axis was more than 90° from the reference hand pose. The simulated hammering task involved a hammer blow directed downward. With the predicted hand and digital human model posture, that motion would be generated using the elbow pronation degree of freedom. The muscles involved for this degree of freedom are less indicated for forceful exertions in comparison to the flexion degree of freedom. This suggests that the grasp and digital human model posture predicted using the hinge constraint are not adequate for the task.

The results determined using the cylindrical constraint showed a compromise between the digital human model posture and hand-tool relative pose. In fact, this constraint reduced arm and wrist deviations with respect to the frame constraint, but also reduced hand rotation around the handle axis with respect to the hinge constraint. That rotation was close to the imposed limit (60°), but was still below it. This is because the additional rotation degree of freedom was introduced as an optimization variable, in an attempt to keep the hand-tool pose as close as possible to the reference one. However, more weight was given to the arm degree of freedom in the optimization. This has the positive effect of reducing the hand-pelvis distance.

The resulting positioning determined using the flexible cylindrical constraint shows the best compromise between the digital human model posture and hand-tool relative pose. This constraint leads to a negligible arm deviation, which is more acceptable from an ergonomics point of view. The reduction of joint deviation is due to a more flexible hand-tool pose, which allows some hand rotation around the handle axis, in addition to some hand rotation in the plane of the palm. Since these additional degrees of freedom were part of the optimization, the rotation around the handle can be entirely removed and the hand palm rotation stays below its upper limit. The resulting grasp appears more adequate than that of the other constraints. Moreover, the digital human model is placed more directly in front of the hammer compared to the positioning determined using the frame, hinge, and cylindrical constraints. This posture suggests that the downward force on the mallet will be generated by the elbow flexion and wrist ulnar deviation, which are more indicated for forceful exertions. The hand rotation about the plane of the palm represents the flexibility of the grasping hand. In the taxonomy of Feix, et al [8], three of the grasps involve that additional rotation (i.e., medium wrap, adducted thumb, and index finger extension). Meanwhile, the small and large cylinder grasps do not involve that extra rotation. The embodiments show that the medium wrap and a small cylinder grasp of the Feix taxonomy can be generated by allowing this extra hand pose mobility before generating an enveloping grasp on the object.

One particularity of the predicted digital human model postures is that they did not involve any spine or lower limbs deviation. This was because these degrees of freedom were not activated, however, it is noted that in an alternative embodiment spine and lower limb degrees of freedom can be employed. While spine and lower limb degrees of freedom were not used to determine the aforementioned results, the root at the left foot was allowed to translate along the floor plane and rotate around the normal of this plane. For the simulated task, the combined mobility of the root and upper extremity was sufficient to reach the hand-tool constraints without involving any other degrees of freedom. Using such a limited degree of freedom configuration as a first attempt to reach an object may be useful for two reasons. First, the center of gravity moves only a little, so it does not have to be monitored and controlled. Second, since the spine is not used, no MSD risk related to lumbar exertions is going to be flagged during any subsequent ergonomic analysis. In an embodiment, if the tool cannot be reached with that limited mobility, the spine and lower extremities can then be activated.

In embodiments, the offset between the hand and its end-effector can be static and determined based on the size of the grasped feature by accessing a database of pre-determined offsets. The offset can also be determined on the fly. In the taxonomy of Feix, et al. [8], grasps are classified according to parameters such as the type of opposition (i.e., pad, palm, side), the functional finger units working together (i.e., virtual fingers) and whether the thumb is adducted or abducted. This information can be exploited to define a variable offset. At each step of hand closure, that offset can be recomputed to ensure grasp stability.

Grasping the object, e.g., hammer, to use it, e.g., hammering, is not the only grasp that can be generated by embodiments. Embodiments can cover more tasks (e.g. move, hold), more tools (e.g. drill, plier, brush, pistol-style drill) and more grasps (e.g., pinches, prismatic 2 to 4 fingers). These new grasping parameters can utilize new hand-tool reference positions, hand-tool constraints, and grasp configurations.

Figure 27:
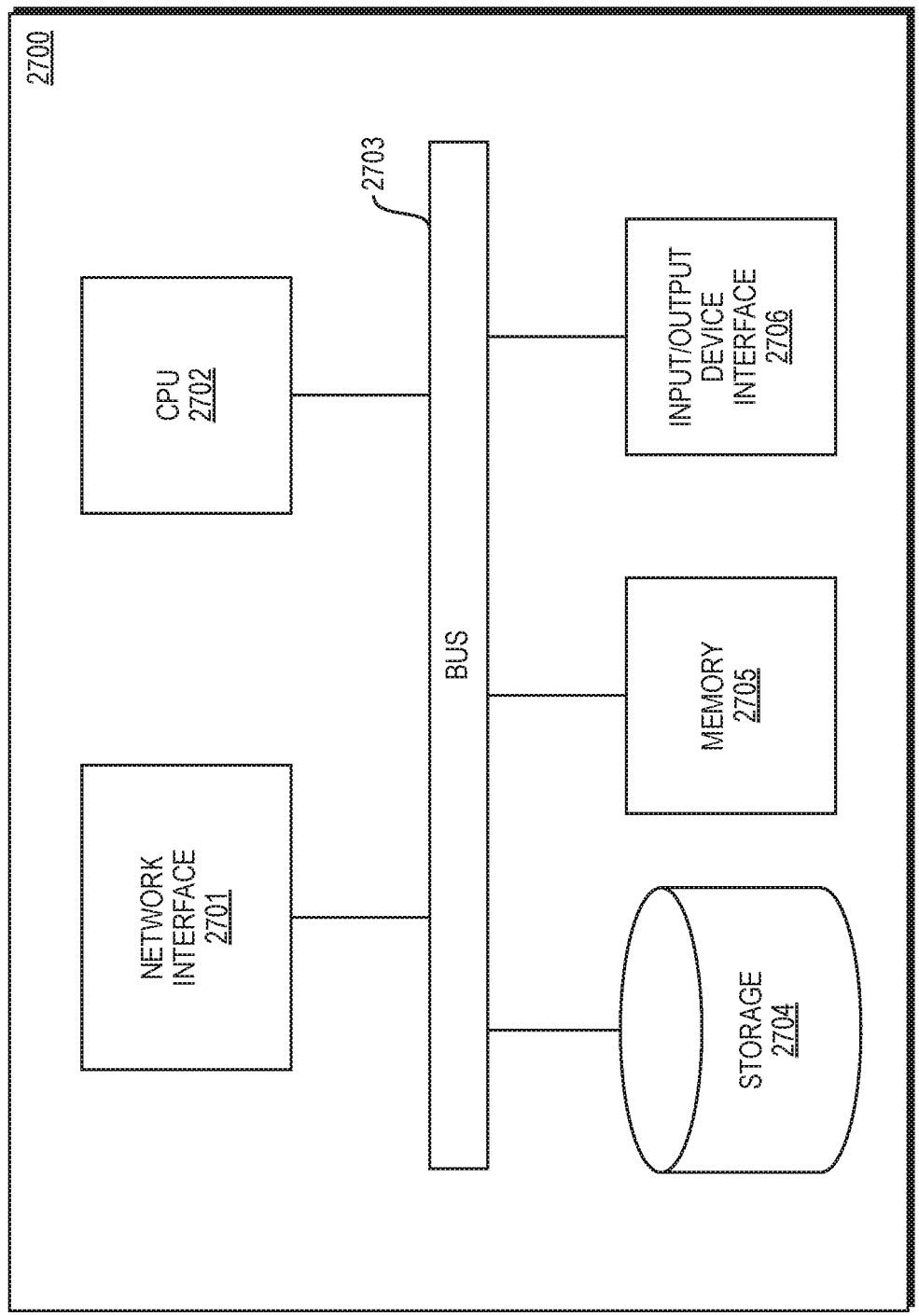
FIG. 27 is a simplified diagram of a computer system for determining positioning according to an embodiment.

FIG. 27 is a simplified block diagram of a computer-based system 2700 that may be used to determine positioning of an object performing grasping according to any variety of the embodiments of the present invention described herein. The system 2700 comprises a bus 2703. The bus 2703 serves as an interconnect between the various components of the system 2700. Connected to the bus 2703 is an input/output device interface 2706 for connecting various input and output devices such as a keyboard, mouse, display, speakers, etc. to the system 2700. A central processing unit (CPU) 2702 is connected to the bus 2703 and provides for the execution of computer instructions. Memory 2705 provides volatile storage for data used for carrying out computer instructions. Storage 2704 provides non-volatile storage for software instructions, such as an operating system (not shown). The system 2700 also comprises a network interface 2701 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 2700, or a computer network environment such as the computer environment 2800, described herein below in relation to FIG. 28. The computer system 2700 may be transformed into the machines that execute the methods described herein, for example, by loading software instructions into either memory 2705 or non-volatile storage 2704 for execution by the CPU 2702. One of ordinary skill in the art should further understand that the system 2700 and its various components may be configured to carry out any embodiments or combination of embodiments of the present invention described herein. Further, the system 2700 may implement the various embodiments described herein utilizing any combination of hardware, software, and firmware modules operatively coupled, internally, or externally, to the system 2700.

Figure 28:
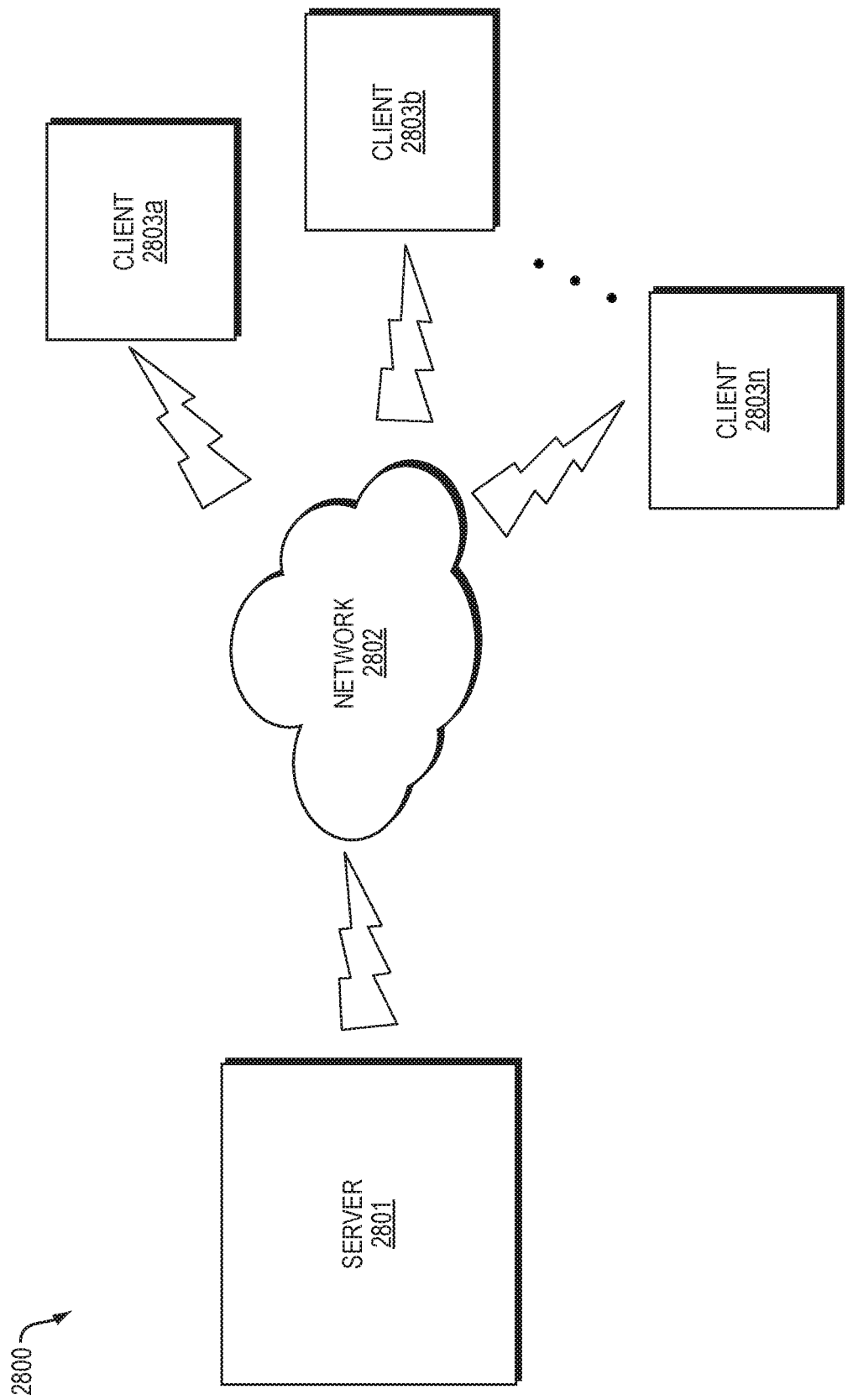
FIG. 28 is a simplified diagram of a computer network environment in which an embodiment of the present invention may be implemented.

FIG. 28 illustrates a computer network environment 2800 in which an embodiment of the present invention may be implemented. In the computer network environment 2800, the server 2801 is linked through the communications network 2802 to the clients 2803a-n. The environment 2800 may be used to allow the clients 2803a-n, alone or in combination with the server 2801, to execute any of the embodiments described herein. For non-limiting example, computer network environment 2800 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

REFERENCES

1. Cutkosky, M. R. On grasp choice, grasp models, and the design of hands for manufacturing tasks. *IEEE Transactions on robotics and automation*, 5 (3). 269-279.
2. Ekvall, S. and Kragic, D., Interactive grasp learning based on human demonstration. in *Robotics and Automation, 2004. Proceedings. ICRA '04. 2004 IEEE International Conference on*, (2004), IEEE, 3519-3524.
3. El-Khoury, S. Approche mixte, analytique et par apprentissage, pour la synthèse d'une prise naturelle, Paris 6, 2008.
4. Endo, Y., Kanai, S., Kishinami, T., Miyata, N., Kouchi, M. and Mochimaru, M. An application of a digital hand to ergonomic assessment of handheld information appliances, SAE Technical Paper, 2006.
5. Endo, Y., Kanai, S., Kishinami, T., Miyata, N., Kouchi, M. and Mochimaru, M., A computer-aided ergonomic assessment and product design system using digital hands. in *International Conference on Digital Human Modeling*, (2007), Springer, 833-842.
6. Endo, Y., Kanai, S., Kishinami, T., Miyata, N., Kouchi, M. and Mochimaru, M., Virtual grasping assessment using 3D digital hand model. in *Annual Applied Ergonomics Conference: Celebrating the Past-Shaping the Future*, (2007).
7. Endo, Y., Kanai, S., Miyata, N., Kouchi, M., Mochimaru, M., Konno, J., Ogasawara, M. and Shimokawa, M. Optimization-based grasp posture generation method of digital hand for virtual ergonomics assessment. *SAE international journal of passenger cars-electronic and electrical systems*, 1 (2008-01-1902). 590-598.
8. Feix, T., Romero, J., Schmiedmayer, H.-B., Dollar, A. M. and Kragic, D. The grasp taxonomy of human grasp types. *IEEE Transactions on Human Machine Systems*, 46 (1). 66-77.
9. Fischer, M., van der Smagt, P. and Hirzinger, G., Learning techniques in a dataglove based telemanipulation system for the DLR hand. in *Robotics and Automation, 1998. Proceedings. 1998 IEEE International Conference on*, (1998), IEEE, 1603-1608.
10. Goussous, A. Grasp Planning for digital humans.
11. Hueser, M., Baier, T. and Zhang, J., Learning of demonstrated grasping skills by stereoscopic tracking of human head configuration. in *Robotics and Automation, 2006. ICRA 2006. Proceedings 2006 IEEE International Conference on*, (2006), IEEE, 2795-2800.
12. Miller, A. T., Knoop, S., Christensen, H. I. and Allen, P. K., Automatic grasp planning using shape primitives. in *Robotics and Automation, 2003. Proceedings. ICRA '03. IEEE International Conference on*, (2003), IEEE, 1824-1829.
13. Nguyen, V.-D., Constructing stable grasps in 3D. in *Robotics and Automation. Proceedings. 1987 IEEE International Conference on*, (1987), IEEE, 234-239.
14. Baerlocher, P. Inverse kinematics techniques for the interactive posture control of articulated figures [Ph. D. thesis]. *Ecole Polytechnique Federate de Lausanne (EPFL)*.
15. Buss, S. R. and Kim, J.-S. Selectively damped least squares for inverse kinematics. *Journal of Graphics tools*, 10 (3). 37-49.
16. Cheze, L., Dumas, R., Comtet, J.-J., Rumelhart, C. and Fayet, M. Determination of the number of degrees of freedom of the trapeziometacarpal joint—an in vitro study. *IRBM*, 33 (4). 272-277.
17. El-Khoury, S. and Sahbani, A. A new strategy combining empirical and analytical approaches for grasping unknown 3D objects. *Robotics and Autonomous Systems*, 58 (5). 497-507.
18. Lemieux, P.-O., Barré, A., Hagemeister, N. and Aissaoui, R. Degrees of freedom coupling adapted to the upper limb of a digital human model. *International Journal of Human Factors Modelling and Simulation*, 5 (4). 314-337.
19. Parkinson, M. B. and Reed, M. P. Creating virtual user populations by analysis of anthropometric data. *International Journal of Industrial Ergonomics*, 40 (1). 106-111.
20. Pitarch, E. P., Yang, J. and Abdel-Malek, K. SANTOS™ hand: a 25 degree-of-freedom model, *SAE Technical Paper*, 2005.
21. Reed, M. P., Manary, M. A. and Schneider, L. W. Methods for measuring and representing automobile occupant posture, SAE Technical Paper, 1999.
22. Reed, M. P., Raschke, U., Tirumali, R. and Parkinson, M. B., Developing and implementing parametric human body shape models in ergonomics software. in *Proceedings of the 3rd International Digital Human Modeling Conference*. Tokyo, Japan, (2014).
23. Roa, M. A. and Suarez, R. Grasp quality measures: review and performance. *Autonomous robots*, 38 (1). 65-88.
24. Tay, S. C., Van Riet, R., Kazunari, T., Amrami, K. K., An, K.-N. and Berger, R. A. In-vivo kinematic analysis of forearm rotation using helical axis analysis. *Clinical Biomechanics,* 25 (7). 655-659.
25. Wu, G., Siegler, S., Allard, P., Kirtley, C., Leardini, A., Rosenbaum, D., Whittle, M., D D'Lima, D., Cristofolini, L. and Witte, H. ISB recommendation on definitions of joint coordinate system of various joints for the reporting of human joint motion—part I: ankle, hip, and spine. *Journal of biomechanics,* 35 (4). 543-548.
26. Wu, G., Van der Helm, F. C., Veeger, H. D., Makhsous, M., Van Roy, P., Anglin, C., Nagels, J., Karduna, A. R., McQuade, K. and Wang, X. ISB recommendation on definitions of joint coordinate systems of various joints for the reporting of human joint motion—Part II: shoulder, elbow, wrist and hand. *Journal of biomechanics,* 38 (5). 981-992.
27. Zhou, W. and Reed, M. P. Validation of the human motion simulation framework: posture prediction for standing object transfer tasks, SAE Technical Paper, 2009.

What is claimed is:

1. A computer implemented method of determining whole-body positioning of a mannequin, the method comprising:
    determining a frame of a grasping element of a mannequin represented by a computer-aided design (CAD) model;
    determining a frame of an object to be grasped, wherein the object is represented by a CAD model;
    specifying degrees of freedom of the mannequin;
    setting limits on the specified degrees of freedom; and
    simultaneously using: (i) the determined frame of the grasping element, (ii) the determined frame of the object, (iii) the specified degrees of freedom, and (iv) the set limits on the specified degrees of freedom as inputs to an inverse kinematic solver, determining whole-body positioning of the mannequin grasping the object.

2. The method of claim 1 wherein the CAD model of the mannequin represents at least one of: a human, an animal, and a robot.

3. The method of claim 1 wherein the CAD model of the object represents a real world tool.

4. The method of claim 1 wherein determining the frame of the grasping element comprises:
    defining a frame at a center of prehension of the grasping element;
    relative to the defined frame at the center of prehension of the grasping element, offsetting a virtual segment; and
    setting a frame at an end of the virtual segment as offset as the determined frame of the grasping element.

5. The method of claim 4 wherein a length of the offset is a function of a radius of a cylinder approximating a handle of the object.

6. The method of claim 1 wherein determining the frame of the object comprises:
    receiving indications of physical features of the object that indicate functionality of elements of the object; and
    determining the frame of the object based upon the received indications.

7. The method of claim 1 wherein the specified degrees of freedom include as least one of:
    rotation of the grasping element about an axis of the frame of the object;
    translation of the grasping element about an axis of the frame of the object;
    a constraint on the inverse kinematic solver that an axis of the frame of the grasping element and an axis of the frame of the object coincide;
    a constraint on the inverse kinematic solver of a neutral posture for the mannequin;
    a frame constraint on the inverse kinematic solver;
    a hinge constraint on the inverse kinematic solver;
    a cylindrical constraint on the inverse kinematic solver; and
    a flexible cylindrical constraint on the inverse kinematic solver.

8. The method of claim 1 furthering comprising:
    receiving an indication of relative importance for at least one of the degrees of freedom.

9. The method of claim 8 wherein the inverse kinematic solver is further configured to determine the whole-body positioning of the mannequin based upon the received indication of relative importance for the at least one degree of freedom.

10. The method of claim 9 wherein the inverse kinematic solver is further configured to determine the whole-body positioning of the mannequin by optimizing posture of the mannequin that is defined by an objective function representing the degrees of freedom with the received indication of relative importance.

11. The method of claim 1 wherein the determined whole-body positioning of the mannequin indicates position of the grasping element of the mannequin.

12. The method of claim 1 wherein the determined whole-body positioning of the mannequin indicates global positioning of the mannequin in three-dimensional (3D) space and positioning of the grasping element of the mannequin in 3D space.

13. The method of claim 1 wherein the degrees of freedom are applied to at least one of:
    the grasping element of the mannequin; and
    a joint of the mannequin.

14. The method of claim 1 wherein the inverse kinematic solver is configured to determine the whole-body positioning of the mannequin by minimizing deviation of the mannequin from a neutral posture.

15. The method of claim 1 further comprising:
    based on the determined whole-body positioning, determining closure of the grasping element around the object using a linear interpolation.

16. The method of claim 1 further comprising:
    associating, in computer memory, the determined whole-body positioning of the mannequin with the CAD model of the mannequin.

17. The method of claim 16 further comprising:
    simulating real-world use of the object using the CAD model of the mannequin with the associated determined whole-body positioning.

18. A system for determining whole-body positioning of a mannequin, the system comprising:
    a processor; and
    a memory with computer code instructions stored thereon, the processor and the memory, with the computer code instructions being configured to cause the system to:
        determine a frame of a grasping element of a mannequin represented by a computer-aided design (CAD) model;
        determine a frame of an object to be grasped, wherein the object is represented by a CAD model;
        specify degrees of freedom of the mannequin;
        set limits on the specified degrees of freedom; and simultaneously use: (i) the determined frame of the grasping element, (ii) the determined frame of the object, (iii) the specified degrees of freedom, and (iv) the set limits on the specified degrees of freedom as inputs to an inverse kinematic solver and therefrom determine whole-body positioning of the mannequin grasping the object.

19. The system of claim 18 wherein, in determining the frame of the grasping element, the processor and the memory, with the computer code instructions, are further configured to cause the system to:
define a frame at a center of prehension of the grasping element;
relative to the defined frame at the center of prehension of the grasping element, offset a virtual segment; and
set a frame at an end of the virtual segment as offset as the determined frame of the grasping element.

20. A non-transitory computer program product for determining whole-body positioning of a mannequin, the computer program product executed by a server in communication across a network with one or more clients and comprising:
a computer readable medium, the computer readable medium comprising program instructions which, when executed by a processor, causes the processor to:
determine a frame of a grasping element of a mannequin represented by a computer-aided design (CAD) model;
determine a frame of an object to be grasped, wherein the object is represented by a CAD model;
specify degrees of freedom of the mannequin;
set limits on the specified degrees of freedom; and
simultaneously use: (i) the determined frame of the grasping element, (ii) the determined frame of the object, (iii) the specified degrees of freedom, and (iv) the set limits on the specified degrees of freedom as inputs to an inverse kinematic solver and therefrom determine whole-body positioning of the mannequin grasping the object.

* * * * *